(12) United States Patent
Warner et al.

(10) Patent No.: US 7,268,426 B2
(45) Date of Patent: Sep. 11, 2007

(54) HIGH-FREQUENCY CHIP PACKAGES

(75) Inventors: Michael Warner, San Jose, CA (US);
Lee Smith, Chandler, AZ (US);
Belgacem Haba, Cupertino, CA (US);
Glenn Urbish, Coral Springs, FL (US);
Masud Beroz, Livermore, CA (US);
Teck-Gyu Kang, San Jose, CA (US)

(73) Assignee: Tessera, Inc., San Jose, CA (US)

( * ) Notice: Subject to any disclaimer, the term of this patent is extended or adjusted under 35 U.S.C. 154(b) by 70 days.

(21) Appl. No.: 10/783,314

(22) Filed: Feb. 20, 2004

(65) Prior Publication Data
US 2004/0238934 A1 Dec. 2, 2004

Related U.S. Application Data

(63) Continuation-in-part of application No. 10/210,160, filed on Aug. 1, 2002, now Pat. No. 6,856,007, and a continuation-in-part of application No. PCT/US02/27509, filed on Aug. 28, 2002, which is a continuation-in-part of application No. 10/210,160.

(60) Provisional application No. 60/449,673, filed on Feb. 25, 2003, provisional application No. 60/315,408, filed on Aug. 28, 2001.

(51) Int. Cl.
*H01L 23/10* (2006.01)
*H01L 23/34* (2006.01)

(52) U.S. Cl. .............. 257/707; 257/777; 257/E25.012; 257/E23.103

(58) Field of Classification Search ............... 257/686, 257/707
See application file for complete search history.

(56) References Cited

U.S. PATENT DOCUMENTS

| 4,774,630 | A |   | 9/1988  | Reisman et al. |         |
|-----------|---|---|---------|----------------|---------|
| 4,827,376 | A |   | 5/1989  | Voss           |         |
| 5,148,265 | A |   | 9/1992  | Khandros et al.|         |
| 5,148,266 | A |   | 9/1992  | Khandros et al.|         |
| 5,187,122 | A | * | 2/1993  | Bonis          | 438/238 |
| 5,285,352 | A |   | 2/1994  | Pastore et al. |         |
| 5,382,829 | A |   | 1/1995  | Inoue          |         |
| 5,438,305 | A |   | 8/1995  | Hikita et al.  |         |
| 5,473,190 | A |   | 12/1995 | Inoue et al.   |         |
| 5,486,720 | A |   | 1/1996  | Kierse         |         |

(Continued)

FOREIGN PATENT DOCUMENTS

JP 05-04762 2/1993

(Continued)

*Primary Examiner*—Sue A. Purvis
*Assistant Examiner*—Benjamin P. Sandvik
(74) *Attorney, Agent, or Firm*—Lerner, David, Littenberg, Krumholz & Mentlik, LLP

(57) ABSTRACT

A packaged semiconductor chip includes features such as a chip carrier having a large thermal conductor which can be solder-bonded to a circuit panel so as to provide enhanced thermal conductivity to the circuit panel and electromagnetic shielding and a conductive enclosure which partially or completely surrounds the packaged chip to provide additional heat dissipation and shielding. The packaged unit may include both an active semiconductor chip and a passive element, desirably in the form of a chip, which includes resistors and capacitors. Inductors may be provided in whole or in part on the chip carrier.

18 Claims, 15 Drawing Sheets

U.S. PATENT DOCUMENTS

| | | |
|---|---|---|
| 5,491,302 A | 2/1996 | Distefano et al. |
| 5,518,964 A | 5/1996 | DiStefano et al. |
| 5,530,288 A | 6/1996 | Stone |
| 5,536,909 A | 7/1996 | DiStefano et al. |
| 5,557,501 A | 9/1996 | DiStefano et al. |
| 5,576,680 A | 11/1996 | Ling |
| 5,608,262 A | 3/1997 | Degani et al. |
| 5,629,241 A | 5/1997 | Matloubian et al. |
| 5,633,785 A | 5/1997 | Parker et al. |
| 5,642,261 A * | 6/1997 | Bond et al. ............ 361/704 |
| 5,659,952 A | 8/1997 | Kovac et al. |
| 5,677,569 A | 10/1997 | Choi et al. |
| 5,679,977 A | 10/1997 | Khandros et al. |
| 5,688,716 A | 11/1997 | DiStefano et al. |
| 5,706,174 A | 1/1998 | Distefano et al. |
| 5,717,245 A | 2/1998 | Pedder |
| 5,747,870 A | 5/1998 | Pedder |
| 5,757,074 A | 5/1998 | Matloubian et al. |
| 5,766,987 A | 6/1998 | Mitchell et al. |
| 5,787,581 A | 8/1998 | DiStefano et al. |
| 5,798,286 A | 8/1998 | Faraci et al. |
| 5,821,609 A | 10/1998 | DiStefano et al. |
| 5,830,782 A | 11/1998 | Smith et al. |
| 5,869,887 A | 2/1999 | Urushima |
| 5,869,894 A | 2/1999 | Degani et al. |
| 5,886,393 A | 3/1999 | Merrill et al. |
| 5,892,417 A | 4/1999 | Johnson et al. |
| 5,895,972 A | 4/1999 | Paniccia |
| 5,905,639 A | 5/1999 | Warren |
| 5,913,109 A | 6/1999 | Distefano et al. |
| 5,915,752 A | 6/1999 | DiStefano et al. |
| 5,918,112 A | 6/1999 | Shah et al. |
| 5,929,517 A | 7/1999 | Distefano et al. |
| 5,973,391 A | 10/1999 | Bischoff et al. |
| 5,976,913 A | 11/1999 | Distefano et al. |
| 6,005,466 A | 12/1999 | Pedder |
| 6,037,659 A | 3/2000 | Weixel |
| 6,046,076 A | 4/2000 | Mitchell et al. |
| 6,049,972 A | 4/2000 | Link et al. |
| 6,054,756 A | 4/2000 | DiStefano et al. |
| 6,075,289 A | 6/2000 | Destefano |
| 6,081,035 A | 6/2000 | Warren et al. |
| 6,093,888 A | 7/2000 | Laureanti et al. |
| 6,100,594 A * | 8/2000 | Fukui et al. ............ 257/777 |
| 6,104,272 A | 8/2000 | Yamamoto et al. |
| 6,124,546 A | 9/2000 | Hayward et al. |
| 6,133,626 A | 10/2000 | Hawke et al. |
| 6,156,980 A | 12/2000 | Peugh et al. |
| 6,165,814 A | 12/2000 | Wark et al. |
| 6,169,328 B1 | 1/2001 | Mitchell et al. |
| 6,181,015 B1 | 1/2001 | Gotoh et al. |
| 6,194,774 B1 | 2/2001 | Cheon |
| 6,218,729 B1 | 4/2001 | Zavrel, Jr. et al. |
| 6,228,686 B1 | 5/2001 | Smith et al. |
| 6,229,200 B1 | 5/2001 | McLellan et al. |
| 6,238,949 B1 | 5/2001 | Nguyen et al. |
| 6,238,950 B1 | 5/2001 | Howser et al. |
| 6,249,039 B1 | 6/2001 | Harvey et al. |
| 6,252,778 B1 | 6/2001 | Tonegawa et al. |
| 6,255,714 B1 | 7/2001 | Kossives et al. |
| 6,274,937 B1 | 8/2001 | Ahn et al. |
| 6,281,570 B1 | 8/2001 | Kameyama et al. |
| 6,292,086 B1 | 9/2001 | Chu |
| 6,310,386 B1 | 10/2001 | Shenoy |
| 6,323,735 B1 | 11/2001 | Welland et al. |
| 6,326,696 B1 | 12/2001 | Horton et al. |
| 6,329,715 B1 | 12/2001 | Hayashi |
| 6,344,688 B1 | 2/2002 | Wang |
| 6,353,263 B1 * | 3/2002 | Dotta et al. ............ 257/777 |
| 6,362,525 B1 | 3/2002 | Rahim |
| 6,377,464 B1 | 4/2002 | Hashemi et al. |
| 6,387,747 B1 | 5/2002 | Cha et al. |
| 6,492,201 B1 | 12/2002 | Haba |
| 6,498,099 B1 | 12/2002 | McLellan et al. |
| 6,521,987 B1 | 2/2003 | Glenn et al. |
| 6,583,513 B1 | 6/2003 | Utagikar et al. |
| 6,614,660 B1 * | 9/2003 | Bai et al. ............ 361/719 |
| 6,657,296 B2 * | 12/2003 | Ho et al. ............ 257/720 |
| 6,713,856 B2 * | 3/2004 | Tsai et al. ............ 257/686 |
| 2001/0033478 A1 | 10/2001 | Ortiz et al. |
| 2002/0017699 A1 | 2/2002 | Shenoy |
| 2002/0074668 A1 * | 6/2002 | Hofstee et al. ............ 257/777 |
| 2002/0195700 A1 * | 12/2002 | Li ............ 257/700 |
| 2003/0001252 A1 * | 1/2003 | Ku et al. ............ 257/686 |
| 2003/0047797 A1 * | 3/2003 | Kuan et al. ............ 257/678 |
| 2003/0148578 A1 * | 8/2003 | Ku et al. ............ 438/239 |
| 2004/0041249 A1 * | 3/2004 | Tsai et al. ............ 257/686 |

FOREIGN PATENT DOCUMENTS

WO       WO-97/11588 A1     3/1997

* cited by examiner

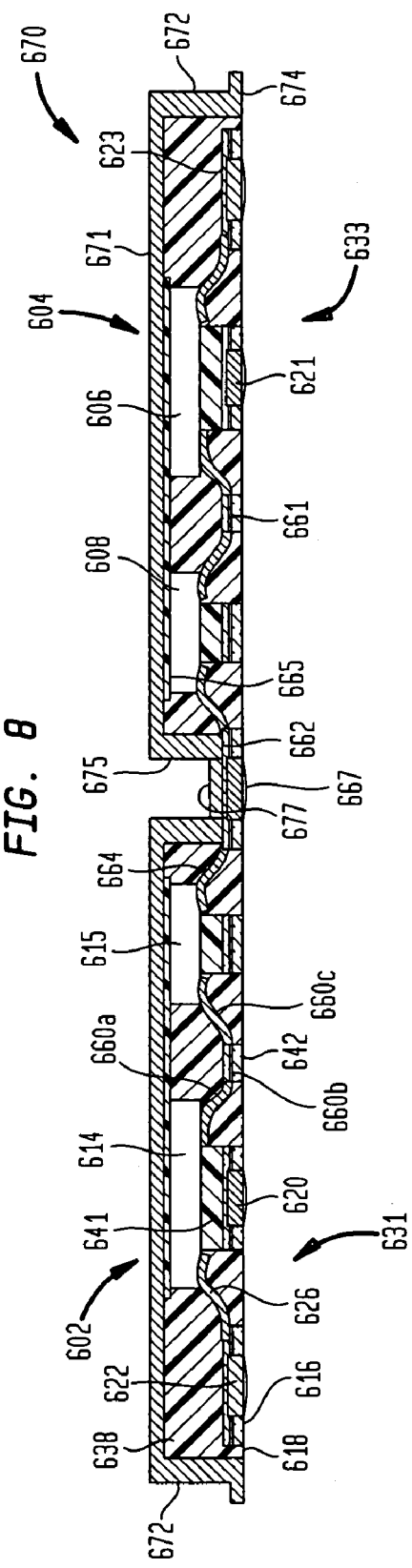

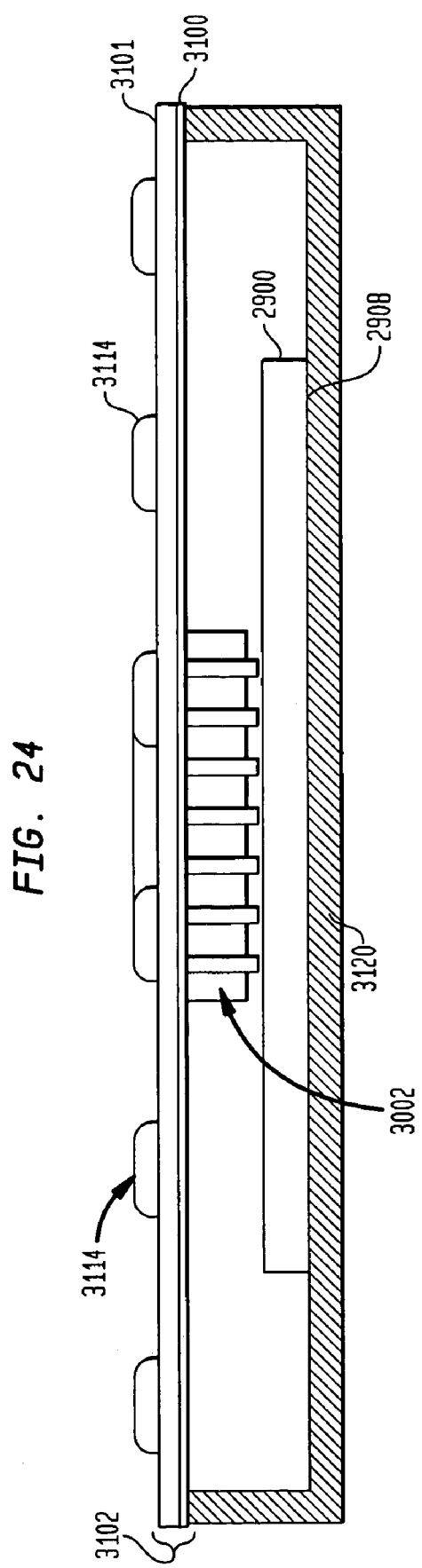

HIGH-FREQUENCY CHIP PACKAGES

CROSS-REFERENCE TO RELATED APPLICATIONS

The present application is a continuation-in-part of commonly assigned, co-pending international application PCT/US02/27509, filed Aug. 28, 2002, designating the United States (hereinafter, "the '509 Application"). Said international application claims the benefit of U.S. Provisional Patent Application No. 60/315,408 filed Aug. 28, 2001. Said international application is also a continuation-in-part of U.S. patent application Ser. No. 10/210,160 now U.S. Pat. No. 6,856,007, filed Aug. 1, 2002, which application also claims the benefit of said U.S. Provisional Patent Application No. 60/315,408. The present application is also a continuation-in-part of said U.S. patent application Ser. No. 10/210,160, filed Aug. 1, 2002. The present application also claims the benefit of U.S Provisional Patent Application No. 60/449,673, filed Feb. 25, 2003 (hereinafter, "the '673 Application"). The disclosures of all of the aforesaid applications are hereby incorporated by reference herein.

BACKGROUND OF THE INVENTION

The present application relates to the art of packaging microelectronic elements such as semiconductor chips.

Semiconductor chips or dies commonly are provided in packages which facilitate handling of the chip during manufacture and mounting of the chip on an external substrate such as a circuit board or other circuit panel. For example, certain packaged semiconductor chips sold under the registered trademark µBGA® by Tessera, Inc., assignee of the present application, incorporate a dielectric element having terminals. The terminals are connected to contacts on the die itself. In particularly preferred arrangements, the connections between the terminals and the die are formed by flexible leads and the dielectric element, its mounting to the die or both are arranged so that the terminals remain moveable with respect to the chip. For example, where the dielectric element overlies a surface of the chip, a layer of a compliant material may be provided between the dielectric element and the chip. The packaged chip can be mounted to a circuit board or other underlying circuit panel by soldering or otherwise bonding the terminals on the dielectric element to contact pads on the circuit board. Because the terminals on the dielectric element can move relative to the chip, the assembly can compensate for differential thermal expansion and contraction of the chip and the circuit board during thermal cycling in service, in storage and during manufacturing processes.

Assemblies of this type are described, for example, in U.S. Pat. Nos. 5,148,265; 5,148,266; and 5,679,977. In certain embodiments, the leads can be formed partially or wholly as elongated metallic strips extending from the terminals along the dielectric element. These strips can be connected to the contacts on the chip by wire bonds, so that the wire bonds and strips cooperatively constitute composite leads. In other embodiments, the strips themselves can be connected directly to the terminals. Certain methods of forming strip-like leads and connecting numerous strip-like leads to numerous contacts on a die are described in U.S. Pat. Nos. 6,054,756; 5,915,752; 5,787,581; 5,536,909; 5,390,844; 5,491,302; 5,821,609; and 6,081,035, the disclosures of which are incorporated by reference herein.

The aforementioned structures, in their preferred embodiments, provide packaged chips with numerous advantageous including the aforementioned ability to compensate for differential thermal expansion and hence high reliability; compatibility with surface-mounting techniques for assembling components to a circuit board and the ability to accommodate numerous connections to the chip in a compact assembly. Some of these packages occupy an area of the circuit board just slightly larger than the area of the chip itself. Certain preferred packages of this type provide short, strip-like leads which minimize self-inductance in the leads and hence provide good high-frequency signal propagation. Moreover, certain packages according to this design can provide good heat dissipation from the chip. These packages have been widely adopted for semiconductor chips in numerous applications.

However, despite these advancements in the art, still further improvement and optimization would be desirable. Chips used for generating or processing radio frequency ("RF") signals, commonly referred to as "RF chips," are used in numerous devices including cellular telephones and wireless data communication devices. RF chips typically generate substantial amounts of heat. Although RF chips typically have only a moderate number of input/output connections, and hence require only a moderate number of connections to the circuit board, these connections should be made with low-inductance leads having controlled, predictable impendence at the frequencies handled by the chip. The packages for RF chips should be compact and economical. Moreover, it would be desirable to provide packages which are particularly well suited to RF chips using the same production equipment and techniques used with other package designs as, for example, the µBGA® chips.

SUMMARY OF THE INVENTION

According to an aspect of the invention, a packaged semiconductor chip includes a first semiconductor chip having a front face, a rear face, edges bounding the faces and contacts exposed at the front face. The first semiconductor chip is packaged together with a second chip having front and rear surfaces and contacts on the front surface, wherein at least some of the contacts on the second chip are electrically connected to at least some of the contacts on the first chip. The front surface of the second chip faces upwardly and confronts a face of the first chip.

A chip carrier is disposed below the rear surface of the second chip, the chip carrier having a bottom surface facing downwardly away from the second chip and having a plurality of terminals exposed at the bottom surface for connection to a circuit panel. At least some of the terminals are electrically connected to at least one of the chips. The chip carrier has an opening coinciding with at least a portion of the rear surface of the second chip, the opening being sized and disposed to coincide with a thermally conductive element of the circuit panel when the packaged semiconductor chip is mounted to the circuit panel.

According to another aspect of the invention, a packaged semiconductor chip is provided which includes a first semiconductor chip having a front face, a rear face, edges bounding the faces and contacts exposed at the front surface. The first semiconductor chip includes active components. A second chip is provided having front and rear surfaces and contacts on the front surface, wherein at least some of the contacts on the second chip are electrically connected to at least some of the contacts on the first chip. The front surface of the second chip faces upwardly and confronts a face of the first chip. A chip carrier is disposed below the rear surface of the second chip, the chip carrier having a bottom surface facing downwardly away from the second chip and having a plurality of terminals exposed at the bottom surface for connection to a circuit panel, wherein at least some of the terminals are electrically connected to at least one of the chips. The chip carrier further includes a thermal conductor underlying at least a portion of the second chip, the thermal conductor having a surface exposed at the bottom surface to provide thermal communication with a thermally conductive element of the circuit panel when the chip carrier is mounted to the circuit panel.

According to another aspect of the invention, a packaged semiconductor chip is provided which includes a first semiconductor chip having a front face, a rear face, edges bounding the faces and contacts exposed at the front surface. A second chip is provided having front and rear surfaces and contacts on the front surface, wherein at least some of the contacts on the second chip are electrically connected to at least some of the contacts on the first chip, and the front surface of the second chip facing upwardly and confronting a face of the first chip.

A chip carrier is disposed below the rear surface of the second chip, the chip carrier having a bottom surface facing downwardly away from the second chip and having a plurality of terminals exposed at the bottom surface for connection to a circuit panel, wherein at least some of the terminals are electrically connected to at least one of the chips. An electrically and thermally conductive enclosure element overlies the first chip.

According to another aspect of the invention, a component is provided for making a microelectronic assembly. The component includes a dielectric element having one or more bonding windows thereon and a unitary metallic sheet adhering to the dielectric element. The unitary metallic sheet includes an electrically continuous portion including a thermal conductor and one or more peripheral portions extending therefrom, and a plurality of terminals having leads formed integrally therewith. The unitary metal sheet further has openings therein, the leads and active terminals being disposed in the openings such that the electrically continuous portion surrounds the leads and active terminals.

According to a further preferred aspect of the invention, an assembly is provided including at least one first chip having front and rear faces, the first chip having a plurality of contacts on the front face, the rear face of the first chip being disposed in thermal communication with the thermal conductor of the unitary metallic sheet, the thermal conductor having an area greater than any one of the active terminals.

The features of the foregoing aspects of the invention can be combined with one another or used separately. Still other objects, features and advantages of the present invention will be more readily apparent from the detailed description of the preferred embodiments set forth below, taken in conjunction with the accompanying drawings.

BRIEF DESCRIPTION OF THE DRAWINGS

FIG. 8 is a diagrammatic sectional view of a module in accordance with yet another embodiment of the invention.

FIG. 9 is a fragmentary, diagrammatic perspective view of a component in accordance with a further embodiment of the invention prior to connection to a chip.

FIGS. 22-23 and 24 are perspective views and a diagrammatic sectional view of an assembly including the subassembly of FIG. 21.

DETAILED DESCRIPTION

Figure 1:
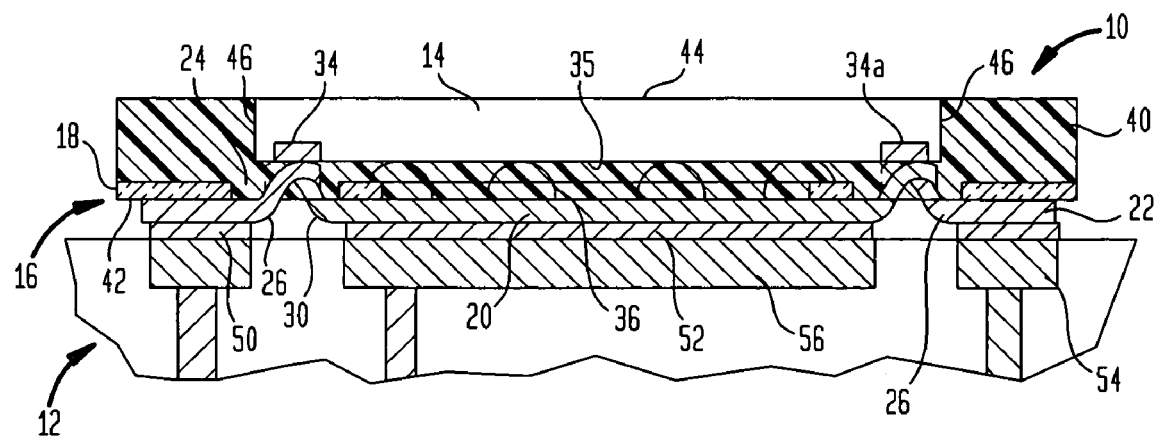
FIG. 1 is a diagrammatic sectional view of an assembly in accordance with one embodiment of the invention, including a packaged chip and a circuit board.
Figure 2:
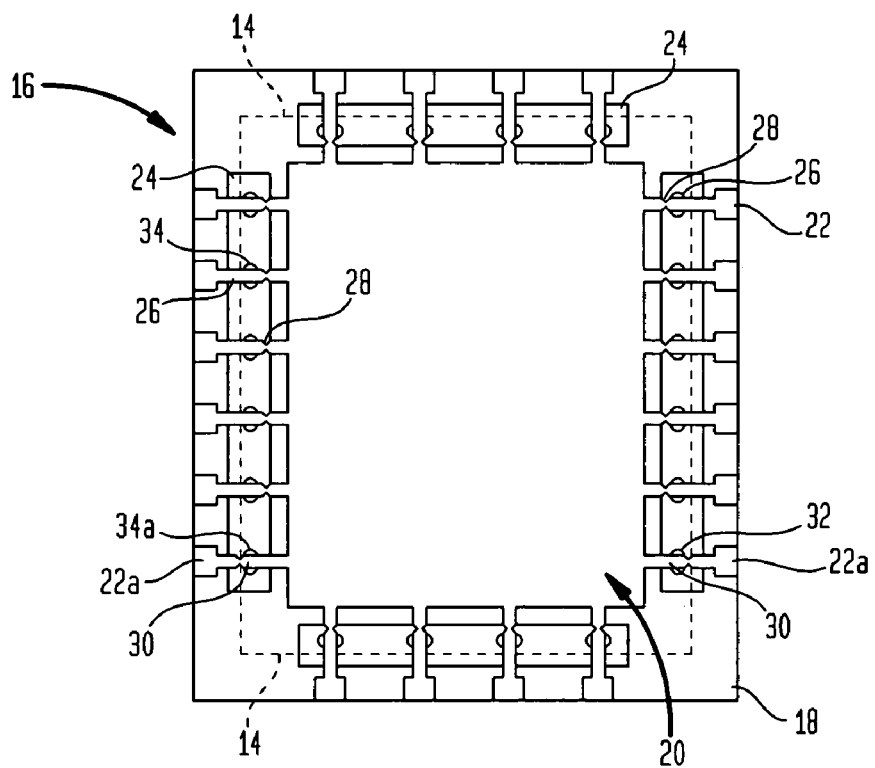
FIG. 2 is a diagrammatic plan view of the packaged chip depicted in FIG. 1 during one stage of manufacture.

FIG. 1 shows a diagrammatic sectional view of a chip assembly according to one embodiment of the invention. The assembly includes a packaged chip 10 mounted to a circuit board 12. The packaged chip 10 includes a chip or "die" 14 and a chip carrier 16. FIG. 2 shows a diagrammatic plan view of the die 14 and chip carrier 16 of FIG. 1 at an intermediate stage during fabrication of the packaged chip. The chip carrier 16 includes a dielectric layer 18 which desirably is a thin, flexible layer of a polymeric dielectric as, for example, polyimide or BT resin. The chip carrier has a large metallic thermal conductor 20 in a central region and a plurality of terminals 22 in a peripheral region surrounding the central region. The dielectric also has apertures or bond windows 24 extending through the dielectric between the terminals and the thermal conductor. Each terminal 22 has a terminal lead 26 associated with it. Each terminal lead 26 has a connection section projecting inwardly from the associated terminal across one of the bond windows 24. Each terminal lead also has a frangible section 28 between the connection section and the thermal conductor, so that the connection sections of the various terminal leads are connected to the thermal conductor through the frangible sections.

A few of the leads are thermal conductor leads 30. The thermal conductor leads are similar to the terminal leads except that the connection sections of the thermal conductor leads are connected directly to thermal conductor 20, without an intervening frangible section. The end of the connection section of each thermal conductor lead 30 remote from thermal conductor 20 is connected to a "dummy" terminal 22a by a frangible section 32. Thus, the frangible sections of the thermal conductor leads are disposed adjacent the outer edges of the bond windows 24, remote from thermal conductor 20.

The terminals, leads and thermal conductor form an electrically continuous structure. Thus, the leads can be plated or otherwise subjected to processes requiring electrical current without the need for any additional electrical commoning element. Preferably, the thermal conductor, leads and terminals are formed from a single layer of copper or copper alloy about 10-30 microns thick, more preferably about 15-20 microns thick, on the dielectric layer. A photoresist can be applied and patterned using conventional techniques so that regions of the copper or copper alloy layer can be selectively removed so as to leave the terminals, thermal conductor and leads in place. In other processes, the thermal conductor, leads and terminals can be formed by selective deposition of one or more metals, such as by patterning a photoresist and plating in areas which are not covered by the photoresist. The bond windows can be formed by etching the dielectric or by exposing the dielectric to radiation such as laser radiation. The fabrication procedure for the chip carrier can be essentially as shown and described in the patents incorporated by reference. Also, although the frangible sections 28 and 32 are illustrated in FIG. 2 as having width less than the width of the connection sections, essentially any type of frangible section can be employed. For example, the leads may incorporate frangible sections of reduced thickness and/or of different metallurgical structure and/or composition from the connection sections.

In fabrication of the package semiconductor chip, a die 14 is juxtaposed with the chip carrier so that the front surface 35 of the die faces toward the chip carrier and so that contacts 34 on the die are substantially aligned with the bond windows and with the connection sections of the terminal leads. Desirably, the arrangement of the leads is selected so that ground contacts on the die are aligned with the thermal conductor leads. In one manufacturing process, the dielectric is supported temporarily above the front or contact bearing surface of the die by a porous layer formed from a plurality of compliant elements or "nubbins" 36 (FIG. 1). As described in U.S. Pat. Nos. 5,706,174; 5,659,952; and 6,169,328, the disclosures of which are incorporated by reference herein, the nubbins typically are provided on the inner surface of the dielectric which faces toward the die. The connection sections of leads 26 and 30 may be bonded to the contacts by advancing a tool such as an ultrasonic or thermosonic bonding tool into the bond windows 24 so as to displace each connection section toward the die. This action breaks the frangible sections of the leads. Thus, the terminal leads 26 remain connected to terminals 22, and these terminals are disconnected from the thermal conductor. The thermal conductor leads 30 are disconnected from the associated dummy terminals 22a but remain connected to thermal conductor 20. Thus, at the end of the bonding process, the signal contacts 34 on the die are connected to the terminals whereas the ground contacts 34a are connected to the thermal conductor. The thermal conductor also serves as an anchor or support to facilitate breakage of the frangible sections associated with the terminal leads.

Following connection of the leads, the assembly is encapsulated by injecting a flowable, typically liquid encapsulant 40 between the die and the dielectric layer of the connection component. The encapsulant desirably also covers the edges 46 of the die, but does not cover the rear surface of the die. Techniques for applying an encapsulant are disclosed, for example, in U.S. Pat. Nos. 5,766,987; 6,049,972; and 6,046,076, the disclosures of which are also incorporated by reference herein. Typically, several connection components are provided as sections of a single dielectric layer tape, which incorporates several sets of terminals and several thermal conductors as aforesaid. Several chips are assembled to the various sets of terminals, and encapsulated, whereupon the tape is severed to provide individual packaged chips.

Other manufacturing processes can be employed. For example, the die can be attached to the connection component by a preformed pad of an adhesive material or "die attach" disposed between the front face 35 of the die and the connection component. Such a pad can be provided as a part of the connection component, or applied during the assembly operation. In another technique, die attach material is provided between the front face of the die and the connection component by dispensing a mass of uncured, flowable die attach onto the connection component or onto the die before assembling the die to the connection component.

After encapsulation, the packaged semiconductor chip has the configuration shown in FIG. 1. As best seen in that figure, the connection sections of the leads 26, 30 are bent toward the die and in contact with the contacts 34, 34a of the die. The encapsulant layer extends between the die and the dielectric element. In this embodiment, the terminals and thermal conductor are disposed on the bottom or outer surface 42 of the dielectric (the surface facing downwardly, away from the die in FIG. 1) and hence are exposed at this surface. The encapsulant surrounds the die but desirably does not overlie the rear surface 44 of the die, remote from the dielectric layer.

In this embodiment, the terminals are disposed outside of the lateral edges 46 of the die. Stated another way, the terminals "fan out" from the die. Because the encapsulant is not directly loaded in shear between a terminal overlying the surface of the die and the die itself, substantial movability of the terminals can be achieved even with an encapsulant having a substantial shear modulus and a substantial modulus of elasticity. Typical encapsulants such as silicone gels tend to have coefficients of thermal expansion ("CTE") substantially greater than that of the die and substantially greater than that of a circuit board to which the packaged chip will be mounted. In a fan-out structure, the fatigue stresses imposed on the leads during thermal cycling arise to some extent from the expansion of the encapsulant itself. Therefore, it is desirable to minimize the CTE of the encapsulant. For common encapsulants, there is an inverse relationship between CTE and modulus of elasticity. Thus, an encapsulant having lower CTE normally will have higher modulus of elasticity and higher shear modulus. Accordingly, the encapsulant 40 used in this embodiment desirably has a coefficient of thermal expansion less than about $200 \times 10^6 /°$ C. and more desirably less than about $100 \times 10^6 /°$ C. The encapsulant in this embodiment preferably has a modulus of elasticity between 0.1 GPa and 3 GPa, typically between 0.5 GPa and 3 GPa, as measured at room temperature. It is desirable to minimize variation in the properties of the encapsulant with temperature as, for example, in the range of temperatures from $-65°$ C. to $+125°$ C. As the thermal conductor 20 overlies the front or contact-bearing surface 35 of the die, that portion of the encapsulant disposed between the thermal conductor and the die will be in direct shear between the die and the thermal conductor due to differential thermal expansion and contraction of these elements. However, strain in this portion of the encapsulant is limited because the entire thermal conductor lies close to the center of the die. Moreover, the bond between the thermal conductor 20 and the thermal conductor mounting of the circuit panel 12, discussed further below, covers a substantial area and thus has substantial strength and fatigue resistance. For this reason as well, stress on this bond due to thermal effects tends to be less critical than stress on the bonds between the terminals and the contact pads. In a variant of this embodiment, the encapsulant may have non-uniform composition and properties as discussed below with reference to FIG. 3.

The packaged semiconductor chip is provided with thin layers of solder 50 on the terminals 22, 22a and with a thin layer of solder 52 on thermal conductor 20. Such thin layers can be applied by application of solder paste and subsequent volatilization of the organic carrier from the paste or by wave-soldering or dip-soldering techniques. Desirably, the solder layers are less than about 75 microns thick, most preferably between 25 and 50 microns thick. The solder layers can be applied before severing the tape to form individual packaged chips.

In an assembly technique according to a further aspect of the invention, the packaged semiconductor chip is assembled to a circuit board or other circuit panel 12 as shown in FIG. 1. In a single operation, using conventional surface-mounting soldering techniques, the terminals are soldered to the contact pads 54 of the circuit board, whereas the thermal conductor 20 is soldered to the thermal conductor mounting 56 of the circuit board. Most preferably, the bond between the thermal conductor and the thermal conductor mounting covers substantially the entire surface area of the thermal conductor, as, for example, at least about 80% of the thermal conductor surface area. Only a small fraction of the circuit board is illustrated. The contact pads 54 of the circuit board are connected by surface or internal connections of circuit panel 12 to appropriate signal-carrying traces and other electrical features of the circuit board, whereas the thermal conductor mounting 56 desirably is connected to a source of ground potential or other constant potential. Thus, after soldering the die is electrically connected to the appropriate signal connections of the circuit board through the terminals 22 and signal leads 26, whereas the die is connected to ground through the thermal conductor leads 30, thermal conductor 20 and thermal conductor mounting 56. The entire structure is quite thin. Typically, the entire structure is less than about 0.8 mm thick and more preferably less than 0.6 mm thick. In one example, the dielectric layer of the chip carrier is about 25-75 µm thick, and most desirably about 50 µm thick. The terminals, leads and thermal conductor are about 10-25 µm thick, and desirably about 18 µm thick, whereas the solder lands used to connect the structure to the circuit board are about 25-50 µm thick. In this embodiment, the encapsulant layer between the front face of the chip and the inner surface of the chip carrier is about 50-75 µm thick. The front face of the chip lies about 180 µm above the face of the circuit board when the assembly is mounted on the circuit board. These thicknesses are merely illustrative.

The thermal conductor 20 and the metallic bond between the thermal conductor and the thermal conductor mounting of the circuit board provide a thermally conductive heat transfer path from the die into the circuit board and also provide electrical shielding between the die and the circuit board. The entire structure is rugged and reliable. Inter alia, the bond between the thermal conductor and the thermal conductor mounting mechanically secures the packaged chip in place.

Figure 3:
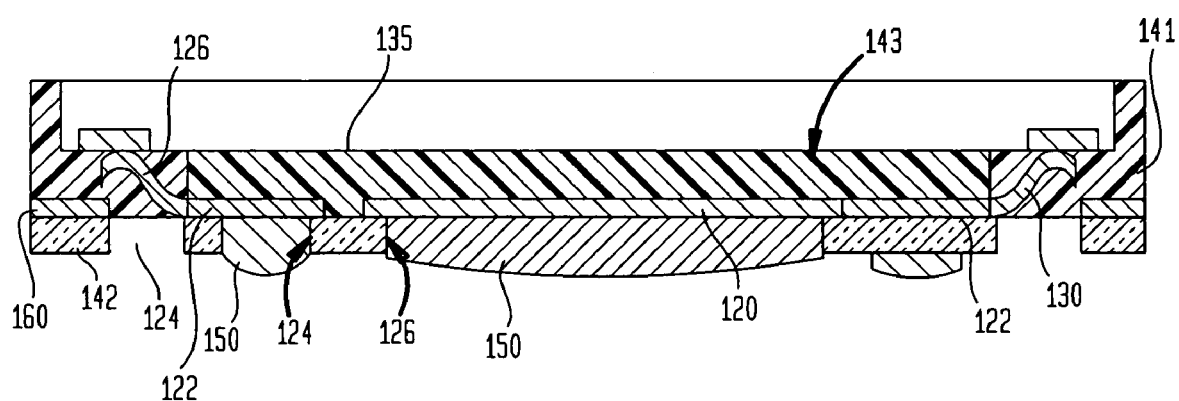
FIGS. 3, 4 and 5 are diagrammatic sectional views of packaged chips in accordance with further embodiments of the invention.

The packaged chip illustrated in diagrammatic sectional view in FIG. 3 is similar to the packaged chip discussed above. However, the thermal conductor 120 and terminals 122 are disposed on the inner surface of the dielectric. Openings 124 are formed in the dielectric in alignment with the terminals and another opening 126 is formed in alignment with thermal conductor 120 so that the terminals 122 and thermal conductor 120 are exposed at the outer surface 142 of the dielectric. Most preferably, the openings in the dielectric at the terminals and the thermal conductor are not plated. Rather, the bonding material such as solder 150 which is used to secure the packaged chip to the circuit board extends through the openings. This avoids the need for expensive plating operations. If desired, a ring of solder-wettable metal may be provided on the outer surface 142 around each such opening to control the shape of the solder masses.

Also, in the embodiment of FIG. 3, the terminals 122 are disposed in a region of the connection component which is disposed in alignment with the front surface 135 of the chip. The terminal leads "fan-in" or project inwardly towards the geometric center of the chip from the contacts on the chip to the terminals. Thus, the terminals are disposed inside the area bounded by the bond windows 124. An anchor 160 is disposed on the opposite side of the bond windows from the terminals. Prior to assembly with the die, the connection sections of the terminal leads 126 are connected to anchors 160 by frangible elements disposed adjacent the anchors. In this embodiment, the thermal conductor leads 130 are also connected to the anchors by frangible elements disposed adjacent to the anchors. The thermal conductor leads extend in regions which are not occupied by terminals and terminal leads. In this arrangement, the anchors serve as electrical commoning for plating during fabrication of the connection component. In the embodiment of FIG. 3, the encapsulant is of non-uniform composition. The region of the encapsulation disposed between the die and the thermal conductor has high thermal conductivity. Such high thermal conductivity can be imparted, for example, by adding thermally conductive filler to the encapsulant. Preferably, the filler itself is dielectric as, for example, boron nitride or alumina. Electrically conductive fillers such as silicon nitride or metals can be employed, preferably in concentrations and in particle sizes such that the encapsulant as a whole, even with the conductive filler, is electrically insulating. The portion 141 of the encapsulant surrounding the connection sections of the leads need not incorporate such a thermally conductive filler. Also, in this embodiment, the encapsulant 141 surrounding the connection sections of the lead and the periphery of the die may have physical properties different from that of the encapsulant 143 disposed between the die and the thermal conductor. For example, the modulus of elasticity of the encapsulant surrounding the leads may be 100 Mpa or less. In a further variant, the border between the two different types of encapsulants can be displaced inwardly, toward the thermal conductor and toward the center of the die front face, from the position depicted in FIG. 3, so that the softer, lower-modulus encapsulant 141 is disposed between the die and the terminals. The stiffer, higher-modulus and more thermally conductive encapsulant 143 is disposed between the die and the thermal conductor.

In the embodiment of FIG. 3, as in the embodiment of FIG. 1, the thermal conductor, the terminals and the leads are all formed from a single layer of a conductive metal such as copper or copper alloy. Placement of this layer on the side of the dielectric facing toward the die, referred to as a "circuits in" configuration, as in FIG. 3, provides the minimum package thickness and provides the maximum solder pad thickness for a given package thickness. However, an arrangement with the thermal conductor and terminals on the side of the dielectric facing away from the die, commonly referred to as a "circuits out" configuration, as in FIG. 1, provides additional spacing between the die and the thermal conductor. This can be advantageous where the die has components such as inductors which interact with a thermal conductor disposed in close proximity to the die.

Figure 4:
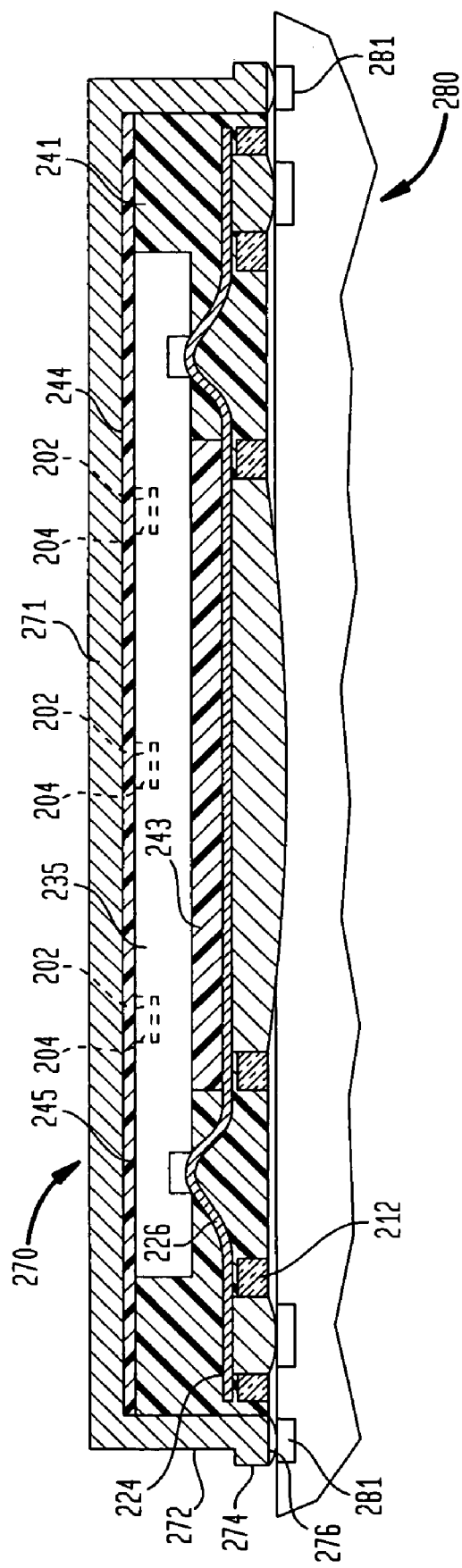

The packaged chip shown in FIG. 4 has the "fan-out" arrangement of the packaged chip shown in FIGS. 1 and 2, but has the thermal conductor 220 and terminals 222 disposed on the inner or upper surface 238 of the dielectric layer as discussed above with reference to FIG. 3. Also, the packaged chip incorporates an element referred to herein as a heat spreader or enclosure 270 having a main portion or top wall structure 271 overlying the rear face 244 of the die (the face facing upwardly in FIG. 4) and having a side wall structure 272 projecting downwardly, beyond the front face 235 of the die to the vicinity of the chip carrier 212, at the periphery of the packaged chip. The side wall structure 272 desirably extends around the entire periphery of the packaged chip, but can be interrupted at locations located along the periphery of the chip. The side wall structure 272 terminates, at its bottom edge, in a flange 274 having a horizontal face 276 facing downwardly and hence facing in the same direction as the outer surface of the chip carrier. Desirably, the bottom edge of the side wall structure is disposed near the bottom surface 142 of chip carrier 212. The spreader or enclosure 220 can be formed from a metal such as copper, a copper alloy, aluminum or other thermally conductive metal. The spreader or enclosure 220 may have some flexibility so that the flange 274 can be displaced in the upward and downward direction during mounting as disclosed in U.S. Pat. No 6,075,289, the disclosure of which is incorporated by reference herein. Desirably, at least the horizontal surface of the flange 276 is formed from or covered by a metal suitable for soldering. During manufacture, encapsulant 241 is injected or otherwise introduced into the interior of the hollow can or spreader 270. Flange 276 may be maintained free of encapsulant by providing a solder mask layer or other temporary layer (not shown) covering the flange and bridging the gap between the flange and the chip carrier. This temporary layer is removed after the encapsulant is cured. When the packaged chip is assembled to the circuit board 280, the horizontal surface 276 of the flange is soldered to a metallic spreader-mounting element 281 on the circuit board. The spreader-mounting element on the circuit board desirably is connected to a ground bus in the circuit board. The spreader or enclosure 270 provides additional heat dissipation capacity and also provides additional electrical shielding. As in the embodiment discussed above with reference to FIG. 3, the encapsulant desirably includes regions having different physical properties. Here again, the encapsulant 243 in the region disposed between the die and the thermal conductor desirably has high thermal conductivity. The space between the rear surface of the die and the main portion or top wall structure 271 of the spreader or enclosure 270 is filled with an encapsulant 245 having high thermal conductivity. This encapsulant also may be electrically conductive so as to form a ground connection to the rear surface of the die. Encapsulant 245 may be a composition including a polymer and a metal, or may be a metallic material such as a solder. In some cases, the entire rear surface of the die serves as a ground plane. Other dies have ground contacts 202 at specific locations on the rear surface. These contacts may be recessed into the rear surface, in depressions 204 open to the rear surface so that the contacts are exposed at the rear surface. For example, dies formed from gallium arsenide often are provided with such rear-surface ground contacts. Where the encapsulant 245 overlying the rear surface is electrically conductive, it desirably abuts the rear surface ground contacts 202 and desirably extends into depressions 204. This provides additional thermal conductivity from within the die to spreader or enclosure 270. In yet another variant, the encapsulant may extend into depressions 204 to provide enhanced thermal conductivity even if contacts 202 are not used. The encapsulant 241 surrounding leads 226 may have a lower modulus of elasticity than the encapsulant 245 at the rear surface.

Figure 5:
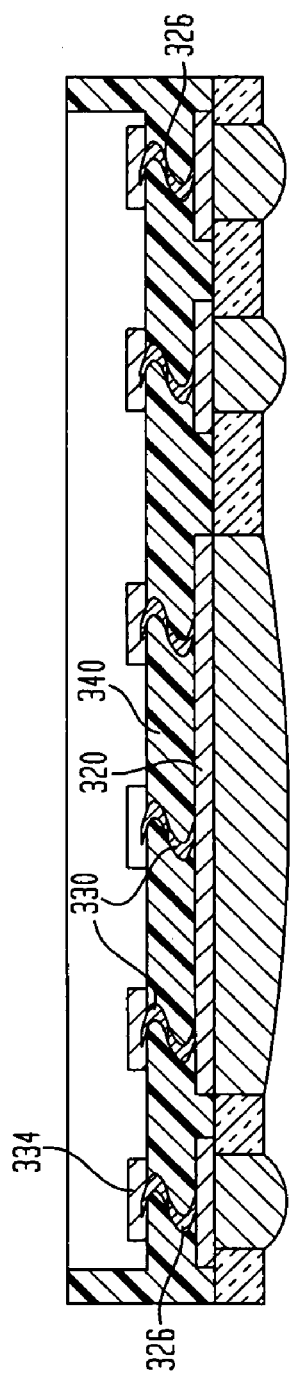

In the embodiment of FIG. 5, the terminal leads 326 are connected to the contacts 334 on the die and formed into a vertically extensive disposition by a process similar to that described in U.S. Pat. Nos. 5,518,964; 5,830,782; 5,913,109; and 5,798,286 the disclosures of which are also incorporated by reference herein. As discussed in certain preferred embodiments of the '964 patent, leads which are initially provided on the connection component or chip carrier may have anchor ends connected to the terminals and tip ends remote from the terminals. The tip ends may be releasably secured to the connection component. All of the tip ends can be bonded to the various signal contacts on the chip in a single operation. After bonding the chip ends to the contacts, the die and the connection component are moved away from one another for a controlled, predetermined displacement thereby moving the tip ends of the leads away from the connection component and deforming the leads to a vertically extensive disposition. Alternatively, the signal leads 326 can be provided on the die. In this case, the tip ends are bonded to the terminals or to other structures of the connection component electrically connected to the terminals before the die and the connection components are moved away from another. The thermal conductor leads 330 which connect the thermal conductor 320 to the ground contacts on the die are formed in the same manner. Desirably, both the terminal leads and the thermal conductor leads are deformed to a vertically extensive disposition in the same movement of the die and connection component. The encapsulant 340 may be injected during or after the movement process. Because all of the leads in a given package can be connected and formed in a single operation or the package can incorporate numerous leads without substantial added cost. In particular, numerous thermal conductor leads 330 may be provided. The number of thermal conductor leads may exceed the number used for making the ground connections to ground contacts on the chip. The extra leads may be connected to "dummy" or unused contacts on the front surface of the chip. These dummy contacts need not be connected to internal electrical components of the chip. The numerous thermal conductor leads serve as metallic heat conductors extending between the die and the thermal conductor and further enhance the thermal properties of the package. In a variant of this approach, the thermal conductor leads which serve as active ground conductors, the thermal conductor leads connected to dummy contacts, or both may incorporate structures as disclosed in U.S. Pat. No. 5,557,501, the disclosure of which is also incorporated by reference herein. Also, as disclosed in U.S. Pat. No. 5,976,913, also incorporated by reference herein, movement of the die and the connection component in a deformation process can be controlled by restraining straps which are shorter and stronger than the other leads used in the assembly. Some or all of the thermal conductor leads can be formed as restraining straps.

Figure 6:
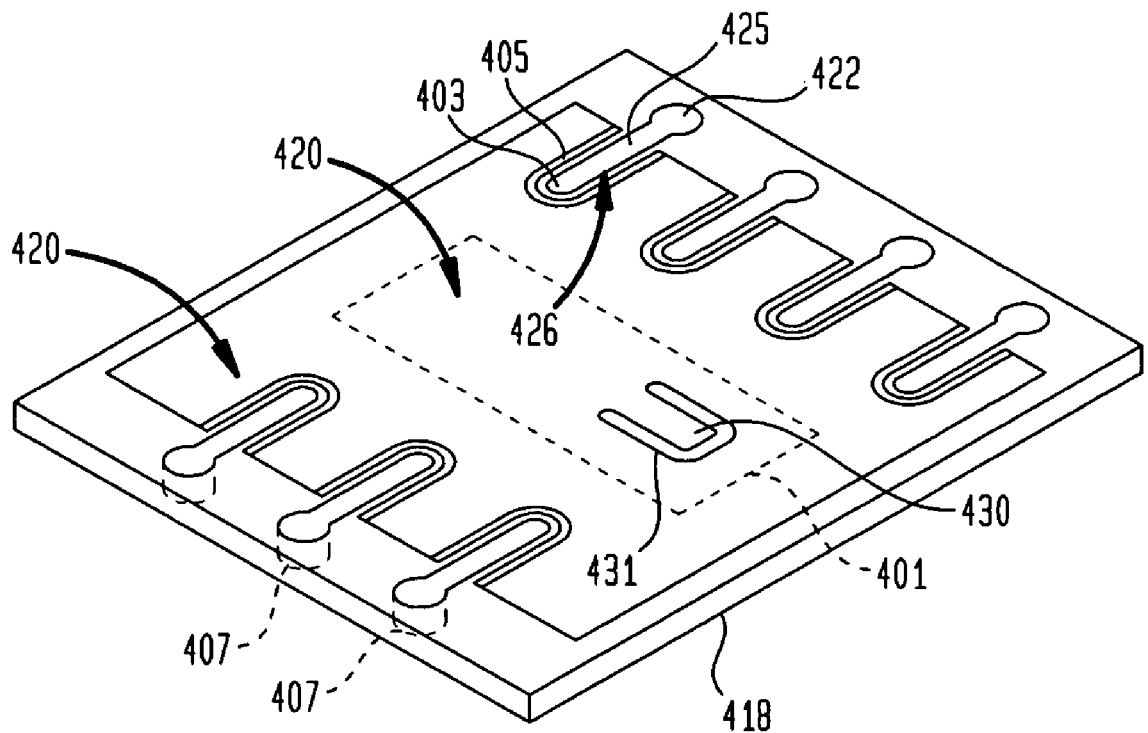
FIG. 6 is a diagrammatic perspective view of a component in accordance with a further embodiment of the invention.

Other forms of leads can be employed. For example, as disclosed in U.S. Pat. No. 6,228,686, the disclosure of which is hereby incorporated by reference herein, a sheet-like element may include a main region and lead region which are partially segregated from the main region by slots extending around each lead region. The slot extending around each particular lead region is interrupted at a fixed end of the lead so that the fixed end remains attached to the main region of the sheet. The connection component diagrammatically depicted in FIG. 6 has terminal leads 426 and thermal conductor leads 430 made in this manner. Thus, each of the tip ends 403 of terminal leads 426 is surrounded by a U-shaped slot 405 which extends toward the terminal 422 attached to such lead. Each terminal lead includes a conductive strip 425 attached to a portion of the dielectric layer 418 disposed inside slot 405. The terminals 422 are disposed on the inner or upper surface of the dielectric layer openings 407 provided to expose the terminals at the lower or outer surface of the dielectric. In this embodiment, the thermal conductor 420 is also disposed on the inner surface of the dielectric layer. Thermal conductor 420 extends beyond the opening 401 in the dielectric layer 418 which is used to expose the thermal conductor at the outer surface. Thus, the thermal conductor partially surrounds those regions of the sheet which constitute the terminal leads so as to provide additional RF shielding in the completed assembly. Thermal conductor lead 430 is formed by a portion of thermal conductor 420 surrounded by a U-shaped slot 431. In use, the tip ends of the terminal leads and the tip end of the thermal conductor lead are bonded to contacts on the die and the die and connection component are moved away from one another so as to bend the various leads out of the plane of the sheet in the manner described in the '501 patent. The reverse arrangement, with the conductive strips and thermal conductor on the lower or outer surface of the dielectric, also can be used. In this reverse arrangement, holes are formed in the dielectric at the tip ends of the terminal leads.

Figure 7:
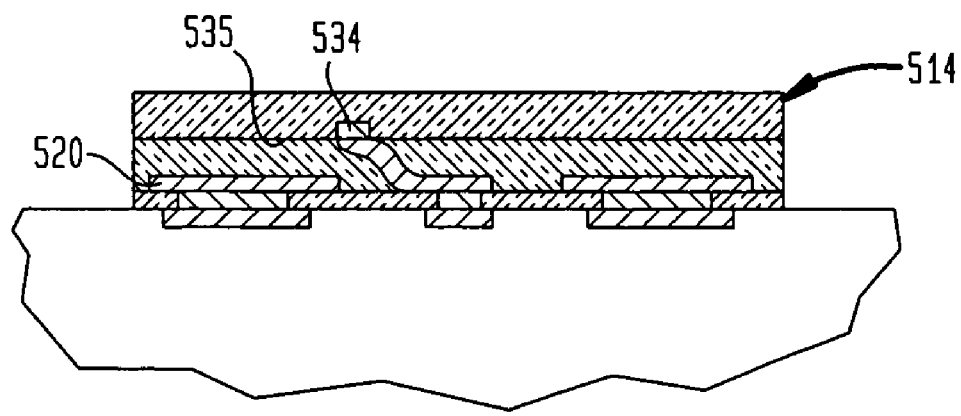
FIG. 7 is a diagrammatic sectional view of an assembly in accordance with a further embodiment of the invention.

In the embodiments discussed above with reference to FIGS. 1-6, the thermal conductor is provided in a central region of the connection component, aligned with the central region of the die front face. However, this is not essential. Thus, as depicted in FIG. 7, a die 514 may have contacts 534 disposed adjacent the center of the die front face 535. In this case, the thermal conductor 520 may be disposed adjacent the periphery of the die whereas the terminals may be disposed adjacent the center of the die.

Numerous further variations and combinations of the features discussed above can be utilized without departing from the present invention. For example, leads of the types shown in FIGS. 1-6 can be used in an assembly configured as shown in FIG. 7. Also, bonding materials other than solder may be employed to form the metallurgical bonds of the various assemblies. For example, the terminals, thermal conductor and/or spreader can be bonded to the metal elements of the circuit board by processes such as eutectic bonding, diffusion bonding, welding or thermosonic bonding, or by use of a composite material such as a metal-filled polymer, as, for example, a silver-filled epoxy. In the embodiments discussed above, the terminal leads which carry the signals are in the form of elongated strips having generally rectangular cross-sectional shapes when seen in sectional view along a cutting plane perpendicular to length of the lead. Short, strip-like leads are highly preferred because they provide low inductance connections between the terminals and the contacts of the chip. Desirably, each terminal lead has inductance below 0.3 nH and desirably below 0.2 nH. For even greater control of lead impedance, the leads can be provided as multi-conductor leads of the types described in published International Patent Application PCT/US96/14965, the disclosure of which is also incorporated by reference herein. As described therein, such a multi-conductor lead can incorporate a ground conductor or other constant-potential conductor extending parallel to the actual signal conductor, so as to form a stripline having well-controlled impedance. Alternatively or additionally, a multi-conductor lead can be used as a differential line in which one conductor carries a first copy of the signal and another conductor carries a further copy of the signal having the opposite sign. Such a differential signaling scheme provides substantial immunity to noise and also suppresses radiation of the signal from the line.

A packaged semiconductor module according to a further embodiment of the invention (FIG. 8) includes a first semiconductor chip 614 incorporating active semiconductor components. As used in this disclosure, the term "active semiconductor component" should be understood as referring to components such as transistors having a switching, amplification, photoelectric, light-emitting or other function different from resistance, capacitance and inductance. Most common semiconductor chips such as processors and memory chips incorporate thousand or millions of active components. Moreover, analog or mixed digital/analog chips such as radio frequency amplifiers also incorporate active components. Section 602 also includes a second chip 615 which incorporates at least some passive components and which preferably incorporates only passive components. As used in this disclosure, the term "passive component" should be understood as referring to resistors, inductors and capacitors. Also, the second chip 615 may or may not include semiconductor material. As used in this disclosure, the term "chip" should be understood as referring to an element which includes active components or which includes thin-film components, i.e., components having thicknesses less than about 4 μm, or both. Thus, the term "chip" as used in this disclosure includes common semiconductor chips and also includes components which consist of one or more thin-film components formed on dielectric materials such as glass or on semiconductors materials such as silicon. Chips 614 and 615 are arranged. to cooperate with one another and cooperatively form a first microelectronic assemblage 602. The module also includes a second microelectronic assemblage 604 incorporating an active semiconductor chip 606 and a passive semiconductor chip 608. A chip carrier 616 is also provided. The chip carrier is generally similar to the carriers discussed above. Here again, it includes a dielectric layer 618 and has a top or upper surface 638 and a lower or bottom surface 642. The chip carrier has a first set of terminals 622 disposed in a first region 631 of the carrier and a second set of terminals 623 disposed in a second region 633. The chip carrier also has a first thermal conductor 620 in the first region 631 of the carrier and a second thermal conductor 621 in the second region 633. These elements of the chip carrier may be similar to the corresponding elements of the chip carriers discussed above. The chip carrier is provided with a first set of interconnecting conductive elements 660 in the first region. Each such interconnecting elements 660 includes a first lead 660*a*, a trace 660*b* and a second lead 660*c* at the opposite end of the trace. The second region is provided with a similar set of interconnecting elements 661. Additionally, the chip carrier has a central ground strip 662 which extends into and out of the plane of the drawing in FIG. 8. Ground strip 662 defines the border between the first region 631 (to the left in FIG. 8) and the second region 633 (to the right in FIG. 8).

The first electronic assemblage 602 overlies the top surface 638 of the chip carrier in the first region. The first or active chip 614 is connected by terminal lead 626 to the terminals 622 of the first set, and is also in thermal communication with the first thermal conductor 620. The relationship between the first chip 614 and the first terminals 622 and first thermal conductor 620 may be similar to those discussed above. For example, an encapsulant 641 having a relatively high thermal conductivity may be used to provide intimate thermal communication between the front or contact-bearing surface of first chip 614 (the surface facing downwardly in FIG. 8) and the first thermal conductor 620. The second or passive chip 615 of first assemblage 602 is connected by the first conductive elements 660 to the first chip 614. Thus, leads 660a are bonded to contact (not shown) on first chip 614, whereas leads 660c of the same conductive elements are bonded to contacts on the second or passive chip 615. Also, the second or passive chip 615 of assemblage 602 is connected by leads 664 to the central ground region 662.

Chips 606 and 608, constituting second assemblage 604 are mounted in essentially the same way and overlie the second region 633 of the chip carrier.

The module according to FIG. 8 also includes an enclosure 670. The enclosure 670 may be generally similar to the enclosure discussed above with reference to FIG. 4. Thus, the enclosure includes a top wall structure 671 extending above the chips of both assemblies and side wall structure 672 extending downwardly from the top wall structure to the vicinity of chip carrier 618. Here again, the rear surfaces of the various dies desirably are in thermal communication with the top wall structure 671. For example, a layer of an encapsulant die attach or solder having relatively high thermal conductivity may be provided between the rear surfaces of chips 606, 608, 614 and 615 and the top wall structure 671. In this embodiment as well, the bottom edge of the side wall structure is adapted for connection to a circuit panel. Thus, the bottom edge is provided with a flange 674 arranged for solder bonding or other metallurgical bonding to a corresponding structure on a circuit panel. In this embodiment, however, the enclosure also includes a medial wall structure 675 extending downwardly from the top wall structure 671. The medial wall structure 675 terminates in a plate 677. Plate 677 is metallurgically bonded to the central ground strip 662 and, thus, is both electrically and mechanically connected to the central ground strip 662. The central ground strip 662 desirably is bonded to the mating element of the circuit panel when the module is mounted to the circuit panel, as by one or more solder masses 667.

The enclosure 671 provides mechanical protection and reinforcement to the packaged module. Moreover, the enclosure cooperates with thermal conductors 620, 621 and other metallic components of the chip carrier to provide electromagnetic shielding for the components in both assemblages 602 and 604. Additionally, the medial wall structure 675, in cooperation with central ground strip 662, provides effective electromagnetic shielding between the two assemblages. Thus, assemblage 602 is effectively isolated from assemblage 604. This arrangement can be used to provide such isolation for any type of electronic circuits. It is especially useful in the case where multiple electronic assemblages must be provided in a compact unit. Merely by way of example, modules according to this aspect of the invention can be used in elements of RF transmitting and receiving circuits of cellular telephones. In such a dual-band radio frequency power amplifier, one assemblage 602 provides a radio frequency power amplifier operating in a first frequency band, whereas another assemblage 604 provides a radio frequency power amplifier operating in another frequency band. Both assemblages can operate independently, without cross-talk or interference, even though the components of both assemblages tend to emit substantial amounts of electromagnetic interference. In a variant of the structure shown in FIG. 8, each assemblage may be a unit which includes only one chip; similar advantages of electromagnetic isolation between units will be provided.

However, in the case where each unit includes passive components in addition to the active chip, fabrication of at least some of the passive components in each assemblage in an integrated chip, such as passive chips 615 and 608, makes the module considerably more compact than it would be if the passive components were provided as separate, discrete elements. Resistors and capacitors, in particular, can be fabricated readily in a chip. The materials and processing techniques to make the passive chips 608 and 615 may be different from those used to make the active chips 606 and 614. For example, the passive chips may be formed on materials such as glass rather than on silicon. In another example, the active chips may be formed in whole or in part from compound semiconductors such as III-V semiconductors or II-VI semiconductors, whereas the passive chips may be silicon-based chips. Thus, RF power amplifier chips formed from gallium arsenide and related semiconductors can be used in conjunction with silicon-based passive chips. In another example, the second or passive chips can be made with a larger minimum feature size or "line width" than the active chips, or vice-versa. Additionally, active chips originally made for use with discrete external passive components can be used in conjunction with the passive chips. Thus, compactness similar to that achievable by incorporating the passive components in the active chip itself can be achieved without the expense and difficulty of modifying the active chip itself.

Most preferably, at least some of the inductors used in the circuit are formed at least in part by the chip carrier or by the chip carrier in conjunction with leads and other structures extending to one or both of the chips. Although inductors can be fabricated in a passive or active chip, it is difficult to make inductors with high inductance and, particularly, with a high quality of factor or Q. The chip carrier typically is a "thick-film" structure, having metal layers more than about 2 μm thick, typically more than about 4 μm thick, and most preferably more than about 10 μm thick. Such thick layers commonly are formed by processes such as lamination of metal layers to a dielectric, plating or screen printing. Inductors formed at least in part in the chip carrier can employ large, thick, low-resistance conductors and can provide high inductance values with resistance far lower than that achievable in a thin film structure. Thus, it is desirable to provide at least some of the inductors incorporated in the circuit as structures defined in part or in whole by elements of the chip carrier, by leads extending between the chip carrier and a chip or both. Inductors may further be such as those shown and described in U.S. patent application Ser. No. 10/452,333 filed Jun. 2, 2003 ("the '333 Application"), which is hereby incorporated by reference herein.

Figure 10:
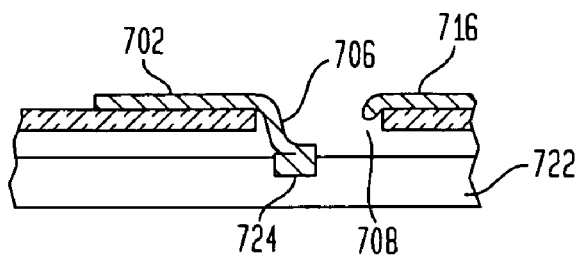
FIG. 10 is a fragmentary, diagrammatic sectional view of a packaged chip incorporating the component of FIG. 9.

As depicted in FIGS. 9 and 10, a substrate such as a chip carrier or other connection component used in conjunction with a semiconductor chip may include a dielectric layer 700 having a trace 702 extending generally in a spiral pattern on the dielectric layer. Trace 702 has leads 704 and 706 formed integrally with the trace. Thus, the trace and leads may be formed on a surface of the dielectric layer by a deposition process or by selective etching of a metallic layer overlying the dielectric layer. The connection component, and hence dielectric layer 700, is provided with openings or bond windows 708 and 710 aligned with leads 704 and 706. As fabricated, the leads 704 and 706 may be provided with anchors 712 and 716. As discussed above in connection with the terminal leads and thermal conductor leads, leads 704 and 706 may be connected to their respective anchors by frangible sections 718 and 720, respectively, when the connection component is manufactured. When the connection component or chip carrier is assembled with a chip 722, the spiral trace 702 overlies the front surface of the chip. Leads 704 and 706 are connected to contacts 724 on the chip and disconnected from their respective anchors, as seen in FIG. 10. The process used for connecting these leads may be identical to the process used for connecting the other leads such as the thermal conductor leads and ground leads discussed above. This is particularly desirable, inasmuch as it avoids the need for separate processing steps and separate equipment.

Figure 11:
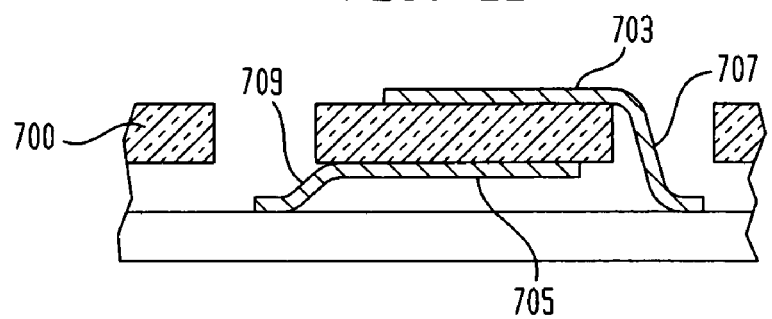
FIG. 11 is a fragmentary, diagrammatic sectional view of a packaged chip according to a further embodiment of the invention.
Figure 12:
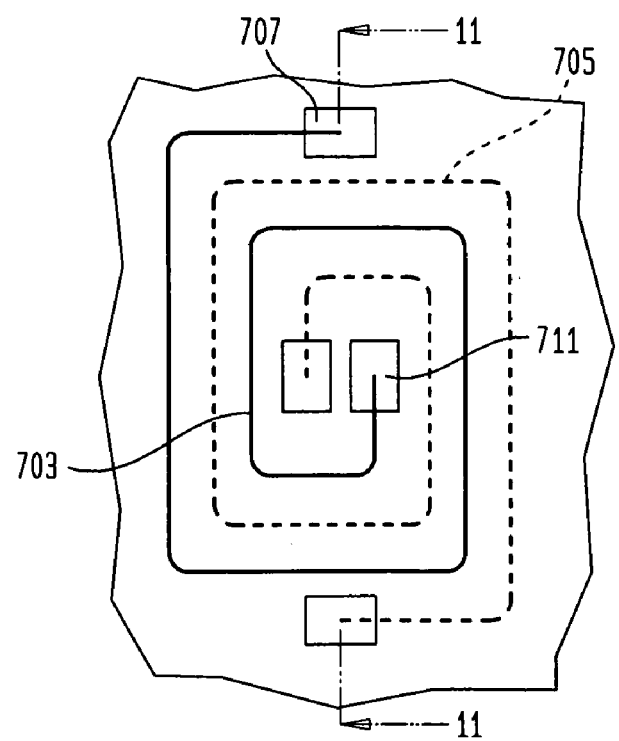
FIG. 12 is a fragmentary, diagrammatic plan view of a component incorporated in the packaged chip of FIG. 11.

As schematically illustrated in FIG. 11, a similar inductor can be made with two spiral coils 703 and 705 overlapping one another on opposite sides of the dielectric layer. Here again, these coils may be connected to a chip by leads 707 and 709, formed integrally with the coils themselves. Such an arrangement can be used to provide a high-value inductor or a transformer. As best seen in FIG. 12, the lead 711 at the inside of spiral coil 703 (on the outer surface of the dielectric layer) may be disposed inside of one or more turns of the spiral coil 705 on the inner surface of the dielectric layer. In this case, the inside lead 711 may extend to the chip through a bond window in the dielectric layer inside of or between turns of the other coil 705.

Figure 13:
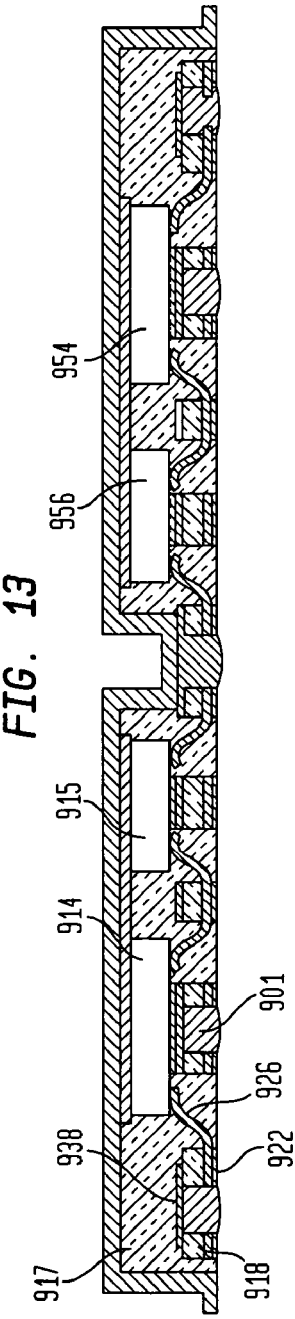
FIG. 13 is a diagrammatic sectional view of a module in accordance with yet another embodiment of the invention.
Figure 14:
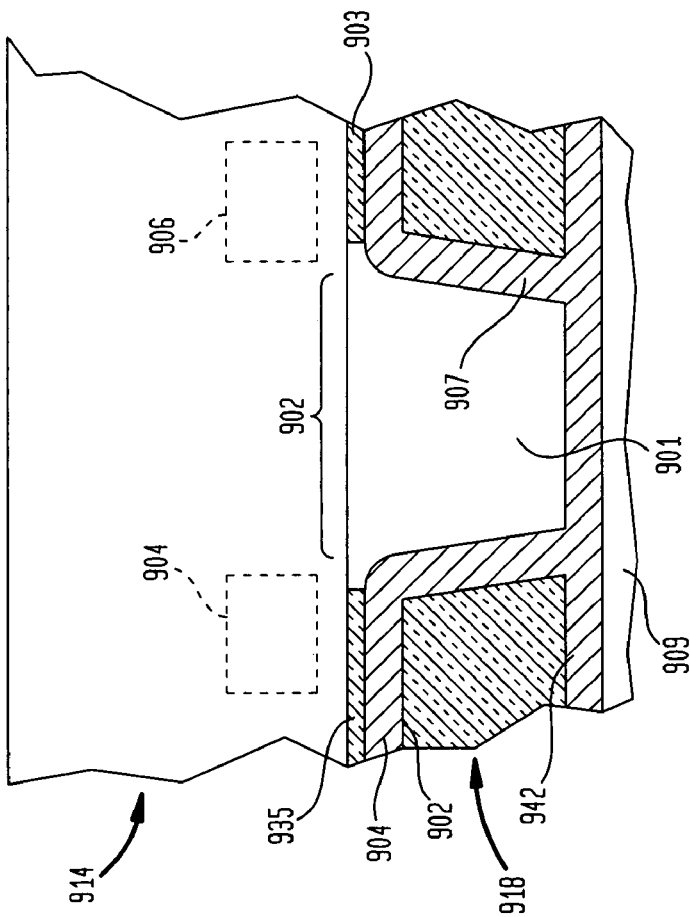
FIG. 14 is a fragmentary sectional view on an enlarged scale of a portion of the module shown in FIG. 13.

A module in accordance with a further embodiment of the invention (FIG. 13) is generally similar to the module depicted in FIG. 8. However, the chip carrier or substrate 918 in this arrangement incorporates a "two-metal" structure, with terminals 922 on the outer or bottom surface and with terminal leads 926 projecting through bond windows or openings in the chip carrier to the chips. A metallic structure is also provided on the inner surface 938 of the chip carrier. Each of the active chips 914 and 906 in this embodiment is a surface acoustic wave chip. As best seen in FIG. 14, chip 914 has a front surface 935 with an acoustic transmission region 902. Internal elements 904 and 906 are arranged to transmit and receive acoustic waves along the surface of the chip within region 902. Various surface acoustic wave devices are well known in the art. These include filters for selecting a signal of a particular frequency and convolvers arranged to combine multiple signals with one another. It is important to keep surface region 902 free of other attached structures and encapsulants in the packaged device.

Chip carrier 918 has a hole 901 extending into the chip carrier from the inner surface 950. A metallic ring 911 is formed on the inner surface and surrounds hole 901. The metallic ring may be formed integrally with other metallic features on the inner surface, or may be separate therefrom. During manufacture, the front face 935 of chip 914 is juxtaposed with the inner surface of the chip carrier and is bonded to the chip carrier at ring 911. Thus, hole 901 provides a gas-filled cavity in alignment with the active surface region 902. The substrate does not contact the active surface region 902. A bonding material 903 desirably is provided between the inner surface of the chip carrier and the front face 935 of chip 914. For example, the bonding material may be a so-called "dry pad," i.e., a pre-formed pad of a die attach material. The die attach material 903 is provided with a pre-formed hole prior to placing the die attach material between the front face of the chip and the chip carrier extending entirely around hole 901. The die attach material forms a seal between the front face of the chip and the inner surface of the chip carrier. During a subsequent stage of manufacture, encapsulant 917 is applied. The seal between the front face 935 of the chip and the inner surface of the chip carrier prevents entry of the encapsulant into hole 901. Alternatively or additionally, if chip 914 is provided with a ring-shaped metallic bond pad on its front face, the bond pad may be metallurgically bonded to ring 911 so as to form a similar seal extending entirely around hole 901 and active surface region 902.

Hole 901 desirably is closed or "blind," so that the hole does not communicate with the bottom or outer surface 942 of the substrate. Hole 901 may be formed by any suitable technique used to for making blind vias in dielectric substrates. Desirably, hole 901 is partially filled with a metallic material. Thus, the hole 901 may have metallic via liner 907 extending along the wall of the hole. The via liner may join with a metallic element 909 on the outer or bottom surface of the substrate. This metallic element serves to close the hole. Moreover, metallic element 909 can be bonded by a solder mass 909, or other metallurgical bonding element, to a contact pad on the circuit panel. The via liner 907 thus serves as a heat-conducting element, so as to abstract heat from chip 914. In a variant of this structure, the chip carrier or substrate 918 is a "single metal" construction, with metallic features on only the outer or bottom surface 942, and hence ring 911 is omitted and hole 901 does not have a via liner. In a further variant, the substrate is a single-metal design with metallic features on only the inner or upper surface 950. The hole 901 in the dielectric of the substrate may be omitted, if ring 911 has sufficient thickness to maintain the active surface region 902 of chip 914 out of contact with the inner surface of the substrate. Alternatively, a hole may be formed partially or completely through the substrate within ring 911 to provide additional clearance. If the hole extends completely through the substrate, it may be closed by an additional element as, for example, a solder mask layer or other sheetlike structure applied on the bottom or outer surface of the substrate.

Structures according to this arrangement provide a gas-filled space in contact with the acoustic region of the surface acoustic wave chip, but also provide the other advantages achieved by mounting a chip in a package having a relatively thin chip carrier. Thus, the entire assembly can be substantially as compact as a unit which does not incorporate a surface acoustic wave device. Moreover, the structure is compatible from the manufacturing techniques used to make packaged chips and modules according to other embodiments of the invention, and the resulting packaged chip can be handled and mounted in the same manner as any other surface-mountable device. In the embodiments of FIG. 13, the surface acoustic wave chip is provided as part of a circuit or assemblage with a passive chip 915, and the module includes a similar assemblage with another surface acoustic wave chip 954 and passive chip 956. However, features such as the hole 901 and bonding material 903 can be used in packages which include only a single surface acoustic wave chip.

A packaged chip assembly according to yet another embodiment of the invention (FIG. 15) incorporates a chip carrier 1018 similar to the chip carriers discussed above and also has an enclosure 1070 similar to those discussed above. First or active chip 1014 is mounted on the thermal conductor 1020 of the chip carrier, with the front or contact-bearing surface 1035 of the active chip facing upwardly, away from the chip carrier and thermal conductor, and with the rear surface 1044 of the active chip facing downwardly, toward the thermal conductor. A passive or second chip 1015 is mounted over the active chip 1014 so that the contact-bearing surface 1017 of this chip confronts the contact-bearing surface 1035 of the active chip. Contacts 1019 of the passive chip 1015 are bonded to contacts 1034 of the active chip as, for example, by small solder bonds, diffusion bonding or other metallurgical bonding technique. Alternatively, other interconnection techniques such as a silver-filled epoxy or other metal and polymer composite, or a layer of anisotropic conductive material may be provided between these chips so as to interconnect mutually facing contacts on the two chips. A composite material of the type sold under the trademark ORMET may be employed. Such a material includes a dielectric such as an epoxy, metal particles and a solder, and cures to form continuous conductors formed from the metal particles and solder extending through the dielectric.

The second or passive chip projects outwardly in horizontal directions generally parallel to the plane of chip carrier 1018 beyond the edges 1021 of the active chip. The passive chip has outer contacts 1023 disposed beyond the edges of the active chip, and has conductors 1025 connected to these outer contacts. Conductors 1025 may connect directly with contacts 1019 and, hence, directly with contacts 1035 of the active chip. The passive chip also incorporates passive components, desirably resistors and capacitors, symbolized by a resistor 1027. As will be appreciated, a number of passive components may be incorporated within the passive chip. Also, some or all of the outer contacts 1023 of the passive chip may be connected to or through such passive components. If the package includes additional discrete components (not shown) or additional chips (not shown), the connections between outer contacts 1023 and inner contacts 1019 may include these elements.

The front, contact-bearing surface 1017 of the passive chip faces downwardly, toward the chip carrier or substrate 108. Thus, the outer contacts 1023 of the passive chip may be readily connected to the terminals 1022 of the chip carrier by leads 1026 similar to those discussed above. Moreover, because the rear surface 1044 of the active chip confronts the thermal conductor 1020, the rear surface of the active chip may be closely coupled to the thermal conductor so as to provide excellent heat transfer from the active chip to the thermal conductor and through the thermal conductor to the circuit panel. For example, the rear surface of the active chip may be coupled by a layer of solder or other metallic bonding material to the thermal conductor. The rear surface 1044 of the active die may be provided with recesses 1004 and rear surface contacts 1002 similar to the rear surface contacts 202 and recesses 204 discussed above with reference to FIG. 4. Here again, the rear surface contacts may serve as ground or power connections to the active die, and provide additional thermal conductivity 1020. As discussed above, the thermal conductor itself desirably is coupled to the thermal conductor mounting pad of the circuit panel by a large mass of solder or other metallic bonding material 1052. Additionally, the passive chip is coupled to enclosure 1070, as by a thin layer of die-bonding material or encapsulant having high heat conductivity, so that both the passive chip and the active chip can be cooled by heat transfer to enclosure 1070. Here again, inductors can be provided in the chip carrier itself or by structures such as those discussed above, including portions formed in the chip carrier and portions extending between the chip carrier and the passive chip.

An assembly according to yet another embodiment of the invention (FIG. 16) includes an active chip 1214 and a passive chip 1115 as discussed above with reference to FIG. 15. In this embodiment, however, the orientation of the chips is reversed. Thus, active chip 1214 is mounted above the passive chip 1115, and the front or contact-bearing surface 1135 of the active chip faces downwardly, toward the chip carrier 1118. The front surface 1217 of the passive chip 1115 faces upwardly, away from the chip carrier. The outer contacts 1123 of the passive chip are connected by leads in the form of wire bonds to terminals 1122 on the chip carrier. The rear surface of the active chip is in thermal communication with the top wall structure 1171 of the spreader or enclosure 1170, whereas the rear surface of the passive chip is in thermal communication with a thermal conductor 1120, which is bonded to a mating metallic element 1152 on the circuit board 1112 when the assembly is mounted on a circuit board. Thus, the passive chip 1115 and thermal conductor provide a thermal path between the active chip and the circuit board when the module is mounted to the circuit board. Moreover, the spreader or enclosure 1170 provides further thermal dissipation from the active chip to the surroundings.

Figure 16:
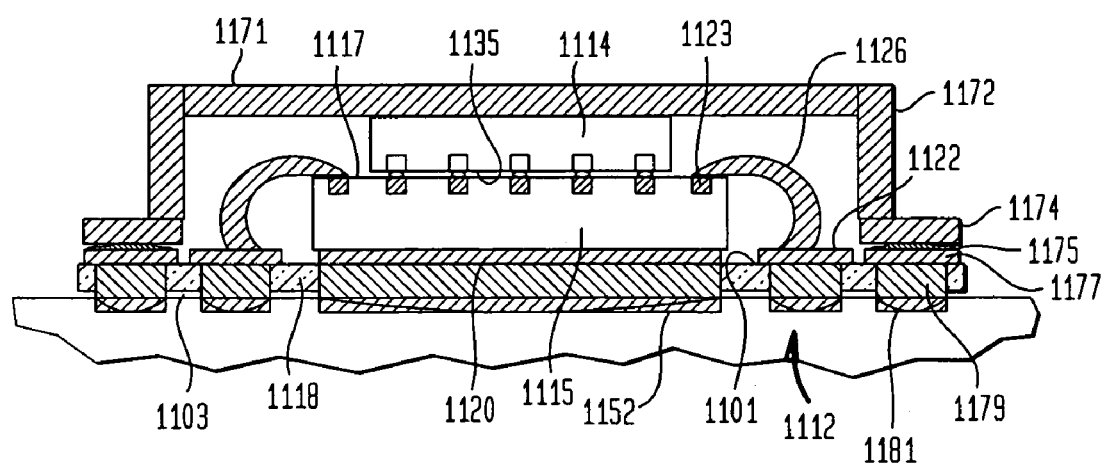

In the embodiment of FIG. 16, the side wall structure 1172 of the enclosure terminates just above the top or inner surface of chip carrier 1118. A flange 1174 at the bottom of the side wall structure is bonded to a metallic rim structure 1177 on the chip carrier, as by a solder or other metallic bonding material 1175 during manufacture of the module. Rim structure 1177 may be in the form of a continuous ring or a series of pads extending around the periphery of the chip carrier. The rim structure is exposed at the bottom or outer surface of the chip carrier, as by an opening or series of openings 1179 extending through the chip carrier. When the module is mounted to circuit board 1112, the rim structure is bonded to a mating element or set of elements 1181 on the circuit board, to provide a good heat dissipation path between enclosure 1170 and the board. This connection, as well as the connection of the thermal conductor 1120 to the board, can be accomplished in the same surface mounting operation used to connect terminals 1122 to the mating contacts on the circuit board.

Figure 17:
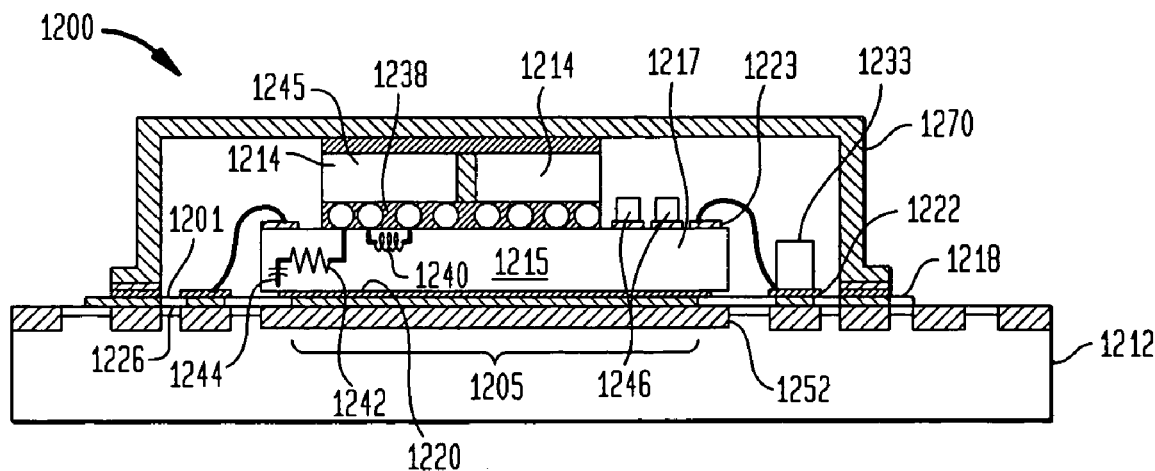
FIG. 17 is a diagrammatic sectional view of packaged chips according to yet another embodiment of the invention.

An assembly 1200 according to yet another embodiment of the invention (FIG. 17) includes one or more first chips 1214 mounted above one or more second chips 1215, the second chips overlying a chip carrier 1218 similar to the chip carriers discussed above. An enclosure 1270 is also provided, similar to those discussed above. The embodiment in FIG. 17 is similar to the embodiment shown in FIG. 16. A pair of first chips 1214 are shown in FIG. 17, although it is understood that either one or two or more such chips 1214 can be provided. For simplicity of description, only one second chip 1215 is shown in FIG. 17. However, it is understood that a plurality of chips can be provided. In the embodiment depicted, the first chips 1214 are active chips incorporating active devices such as radio frequency power amplifier ("RFPA") chips and the second chip is a passive chip which incorporates only passive devices. Reference will be made to such embodiment in the description to follow.

One or more passive devices such as an inductor 1240, a resistor 1242 or a capacitor 1244, are formed integrally to the passive chip 1215 and one or more discrete passive devices 1246 are optionally attached to the front surface 1217 of the passive chip. For example, high value capacitors or inductors for decoupling purposes can be attached as discrete devices 1246 to passive chip 1215. Alternatively or in addition thereto, high value capacitors or inductors can be attached as discrete devices 1233 directly to the chip carrier 1218.

Surface mount connection between the active chips 1214 and passive chip 1215 provides thermal communication between the chips. As described above with reference to FIGS. 1 and 3, thermal communication is enhanced by a thermally conductive encapsulant 1238 disposed as an underfill between the chips. The encapsulant may have uniform properties as disposed between and around the chips or an encapsulant having higher thermal conductivity than that surrounding the chips can be disposed between the chips.

The rear surface 1220 of the passive chip 1215 is in thermal communication with a thermally conductive element 1252 of the circuit board or other circuit panel 1212 when the assembly is mounted on a circuit panel. This is accomplished in the following manner according to an embodiment of the invention. The chip carrier 1218 is formed with an opening 1205 coinciding with an area of the rear surface of the passive chip 1215. Either before or at the time that the passive chip 1215 is mounted to the chip carrier 1218, the rear surface of the passive chip 1215 is desirably metallized, as by a solder coating 1220 applied to the passive chip or the passive chip as attached to the chip carrier 1218. Alternatively, a thermally conductive material such as an encapsulant can be applied to the rear surface 1220 of the passive chip 1215 for this purpose.

Thereafter, the packaged chips, i.e., the chips 1214, 1215, as mounted to chip carrier 1218, enclosure 1270, and such other elements as attached thereto are mounted to a circuit panel 1212 by a surface mounting operation such that the terminals 1222 exposed at the rear surface of the passive chip are mounted to corresponding terminals of the circuit panel 1212. The surface mounting operation can include soldering, or curing of a thermally conductive paste adhering to terminals 1222, such that the metallized rear surface 1220 of the passive chip 1215 is placed in thermal communication with the thermally conductive element 1252 of the circuit panel 1212. As shown in FIG. 17, solder 1226 connects the exposed contacts 1222 of the chip carrier 1218 to the circuit panel 1212.

In a particular embodiment, the rear surface 1220 of the passive chip 1215 need not be metallized prior to bonding the packaged chips assembly to the circuit panel by soldering. The metallization of the rear surface 1220 can occur during the same soldering process used to join the assembly to the circuit panel, as by direct soldering to the exposed rear surface of the passive chip 1215. The metallized rear surface 1220 of the passive chip 1215 and the thermally conductive element 1252 provides a thermal path between the active chips 1214 and the circuit panel 1212 when the module is mounted to the circuit panel.

Figure 18:
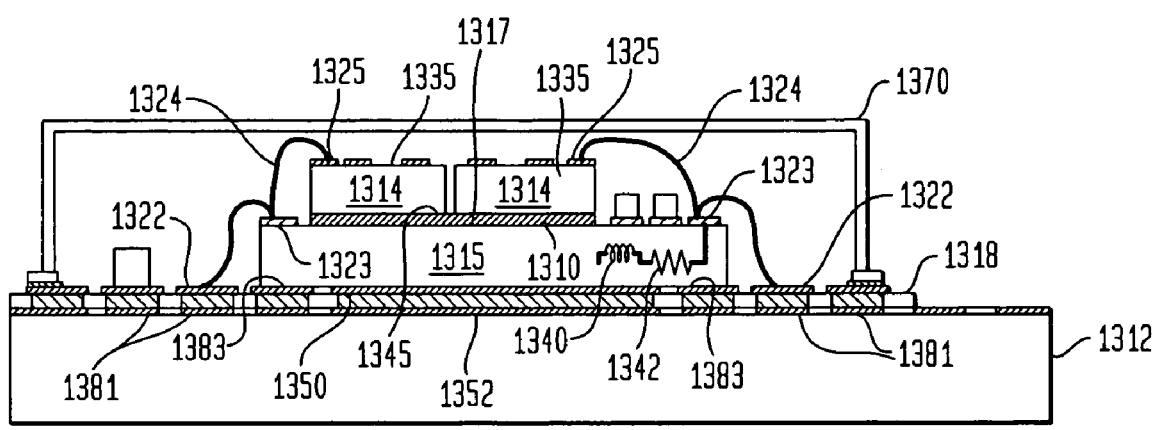
FIG. 18 is a diagrammatic sectional view of packaged chips according to another embodiment of the invention.

The embodiment of FIG. 18 is similar to the embodiment shown in FIG. 17, except that the front or contact-bearing surfaces 1335 of the active chips 1314 face upwardly, away from the chip carrier 1318. The outer contacts 1323 of the passive chip are connected by leads in the form of wire bonds to terminals 1322 on the chip carrier. Additional leads in the form of wire bonds 1324 connect the contacts 1323 to contacts 1325 on the front surfaces 1335 of the active chips 1314.

The rear surfaces 1345 of the active chips 1314 are in thermal communication with the front surface of the passive chip 1315 through a thermally conductive layer 1310. The thermally conductive layer 1310 is desirably a conformal adhesive material such as the thermally conductive encapsulant 1238 in the embodiment described above with reference to FIG. 17. Alternatively, a large thermally conductive pad can be provided on the front surface 1317 of the passive chip 1315 instead of a thermally conductive adhesive. Such pad can serve as a surface to which the rear surface of the active chips are soldered. In such embodiment, prior to soldering, the rear surfaces of the active chips 1314 can be pretreated to provide a solderable surface, such as by applying one or more coatings, e.g., coatings of tin and gold. According to an embodiment, the rear surface of the passive chip 1315 is in thermal communication with a thermal conductor 1350, which in turn, is in thermal communication with a metallic thermally conductive element 1352 of a circuit panel 1312 when the package is mounted on a circuit panel 1312.

In a particular embodiment of the invention, a thermally conductive material is applied to the rear surface of the passive chip 1315, as by a solder coating 1320 or a thermally conductive paste applied thereon, either before or after the passive chip 1315 is mounted to the metallic thermally conductive element 1352 of the circuit panel 1312. Thus, the metallized rear surface 1320 of the passive chip 1315 and the thermally conductive element 1352 provides a thermal path between the active chips 1314 and the circuit panel 1312 when the module is mounted to the circuit panel. In addition, the spreader or enclosure 1370 provides further thermal dissipation from the active chip to the surroundings. In an embodiment of the invention, the passive chip 1315 has an electrically conductive rear surface forming a common connection such as a ground or power connection, and may be provided with ground or power contacts 1383 at discrete locations on the rear surface or in recesses open to the rear surface, similar to the rear surface contacts discussed above with reference to FIGS. 4 and 15.

FIGS. 19-24 illustrate particular embodiments of a connecting element or chip carrier having a unitary metallic sheet on which at least a first chip is mounted. In turn, a second chip is preferably mounted to the first chip, by way of a surface mount, e.g. flip chip attachment.

Figure 15:
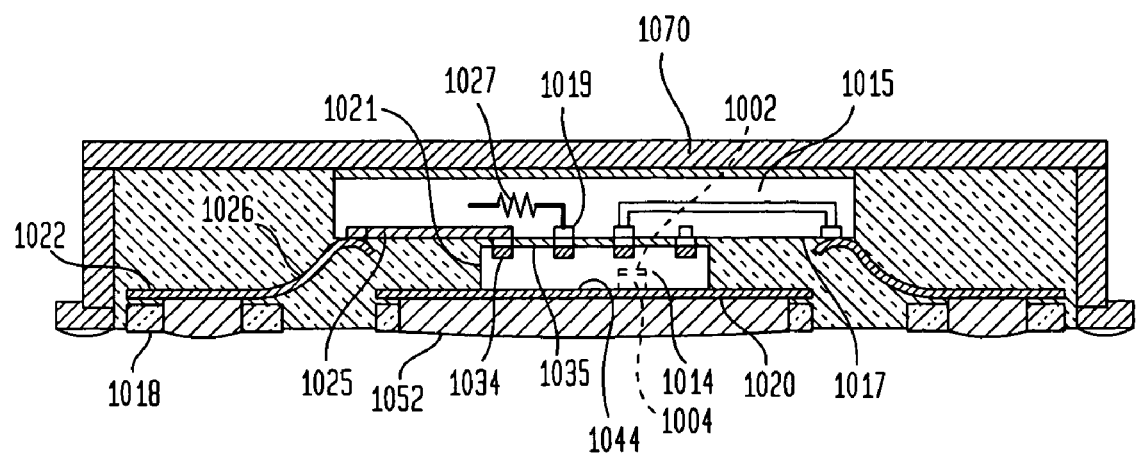
FIGS. 15 and 16 are diagrammatic sectional views of packaged chips according to still further embodiments of the invention.
Figure 19:
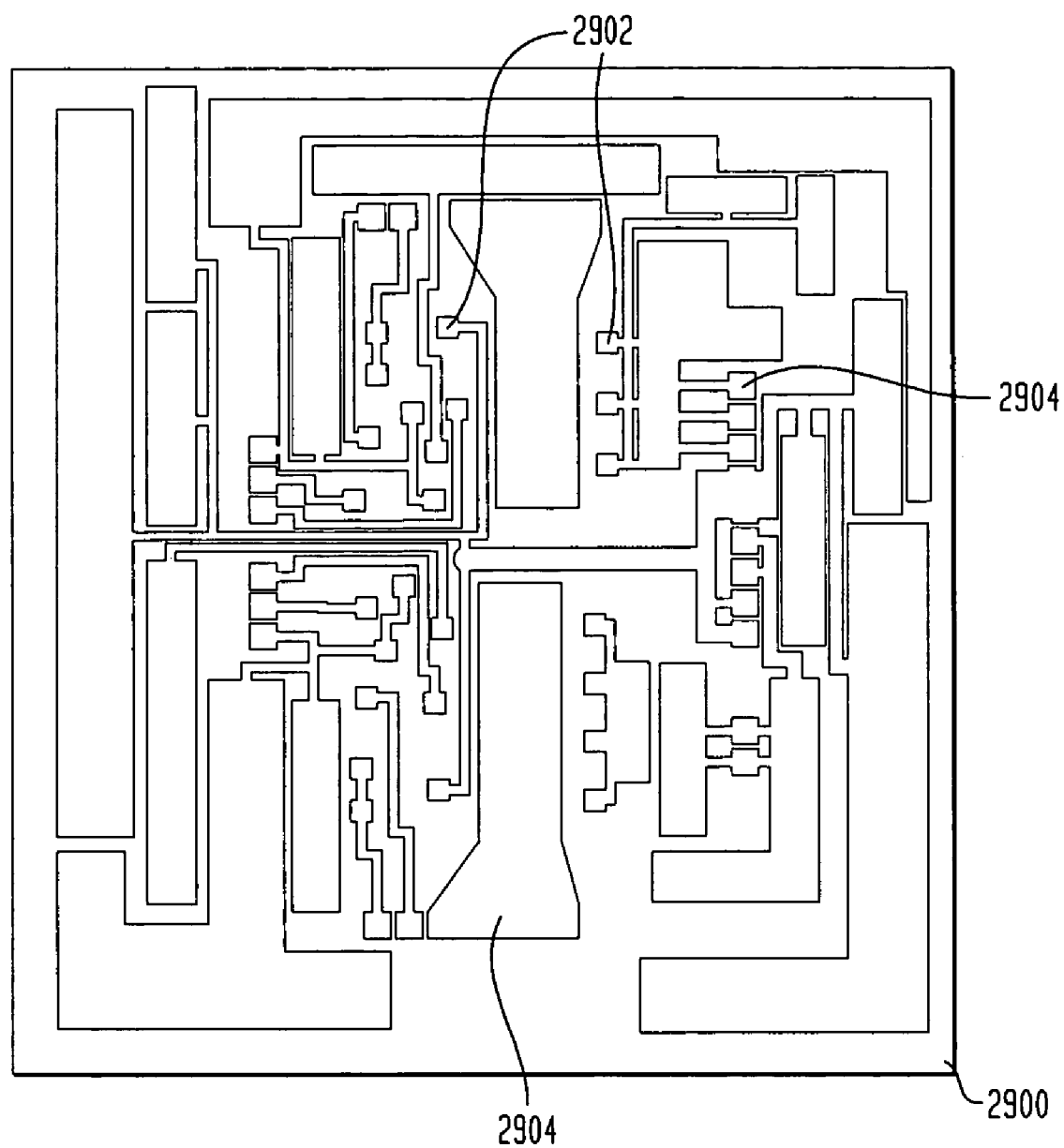
FIGS. 19 and 20 are a plan view and a perspective view, respectively, of a die used in an assembly according to yet another embodiment of the invention.
Figure 20:
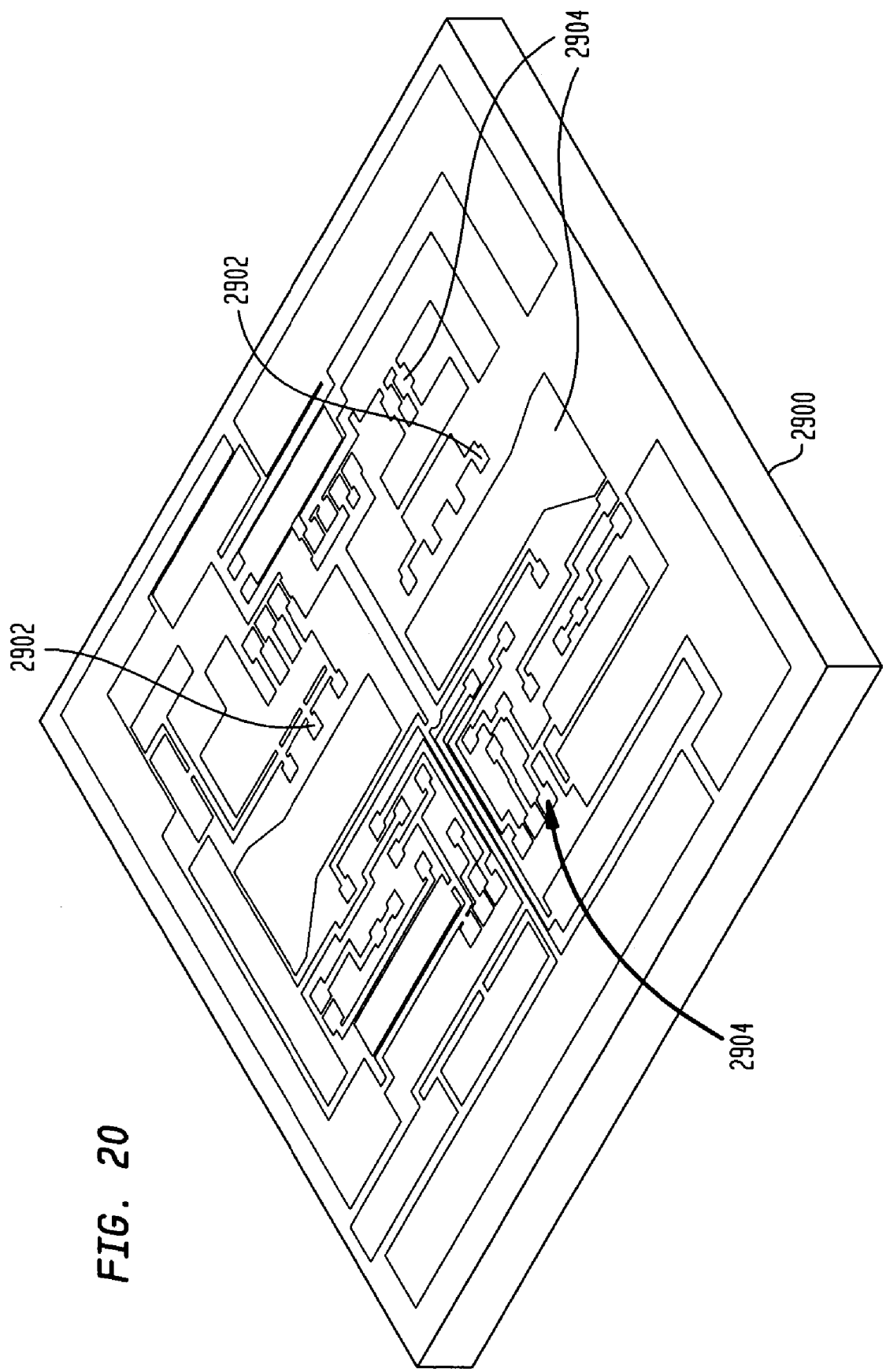
Figure 21:
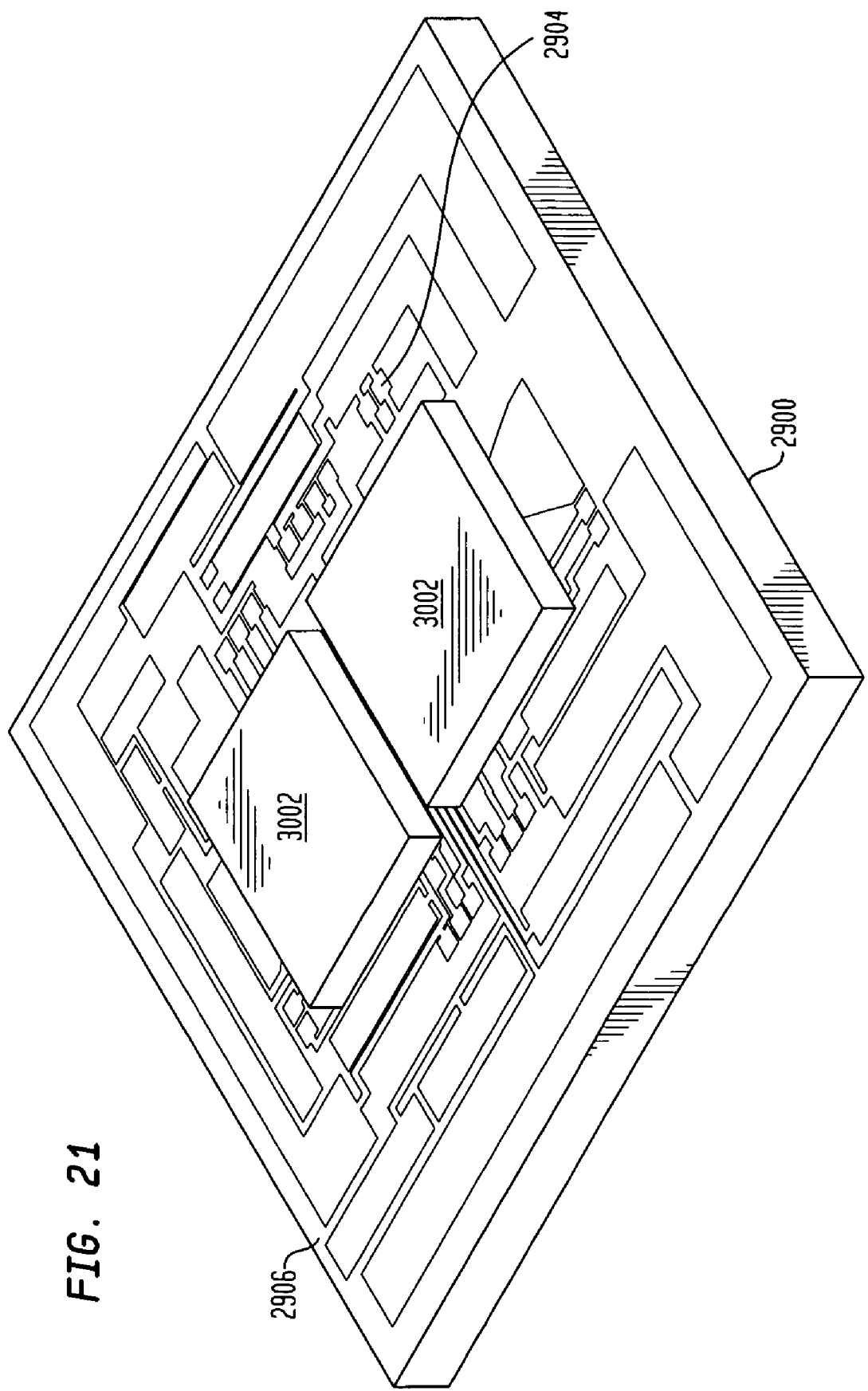
FIG. 21 is a perspective view illustrating a subassembly including the die of FIGS. 19-20.

FIGS. 19 through 24 illustrate a particular arrangement of a package generally similar to FIG. 15. FIG. 19 shows a plan view of an IPOC or passive die. FIG. 20 shows the same die in isometric view. As shown therein, the passive die has contacts including inner or "interior" contacts 2902 for connection to active dies and outer contacts 2904 which are used to connect to the chip carrier. As best seen in FIG. 21 the package includes two active dies 3002. These are mounted in the same arrangement discussed above with reference to FIG. 15, namely, with the front surfaces (hidden from view) of the active dies 3002 confronting the front or contact-bearing surface 2906 of the passive or second die ("IPOC") 2900. In the assembly process, the active dies 3002 are assembled to the passive die 2900 prior to mounting the dies on the chip carrier, although the reverse process (assembling the active dies to the chip carrier, then mounting the passive die) also can be used.

Figure 22:
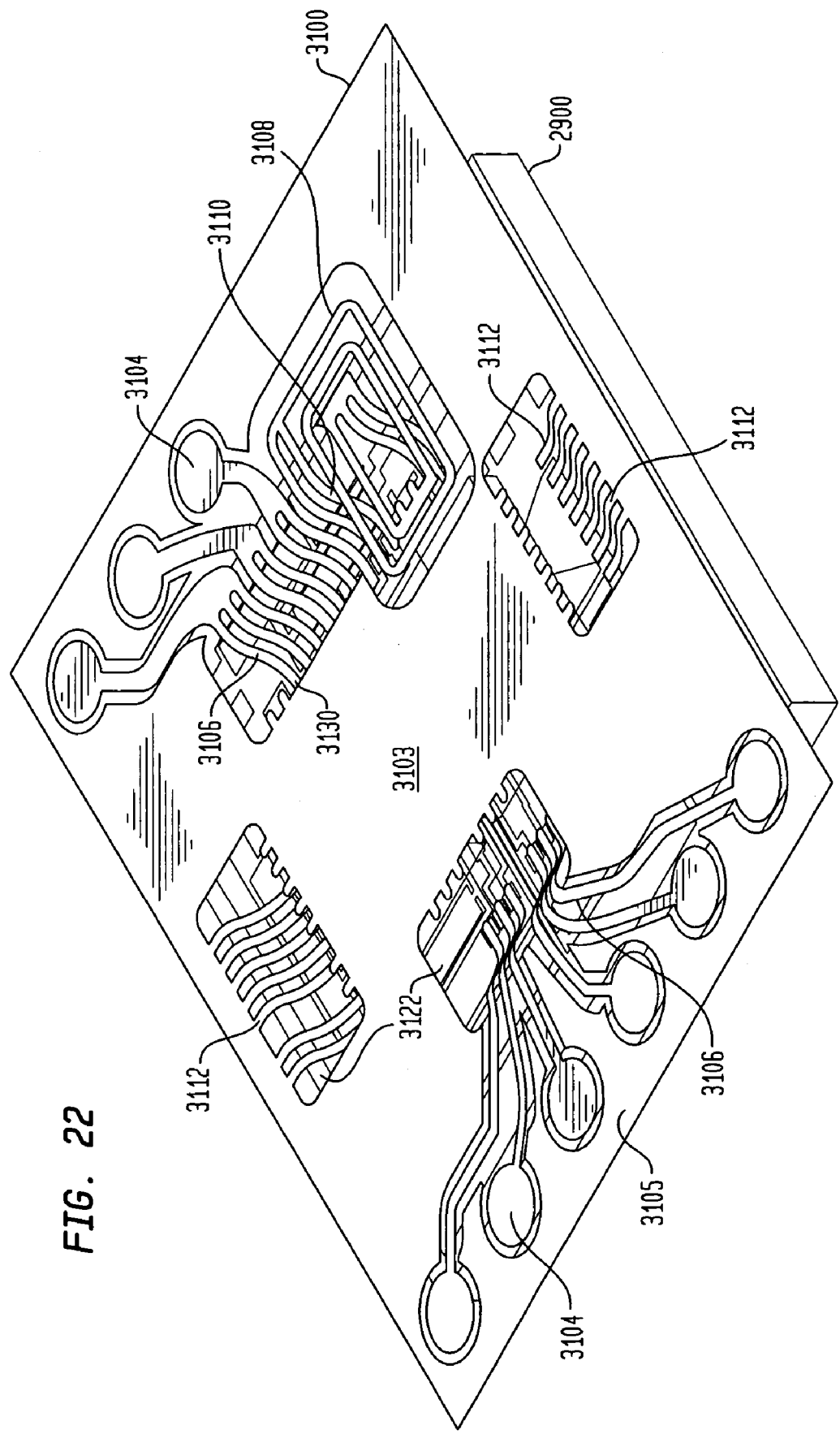
Figure 23:
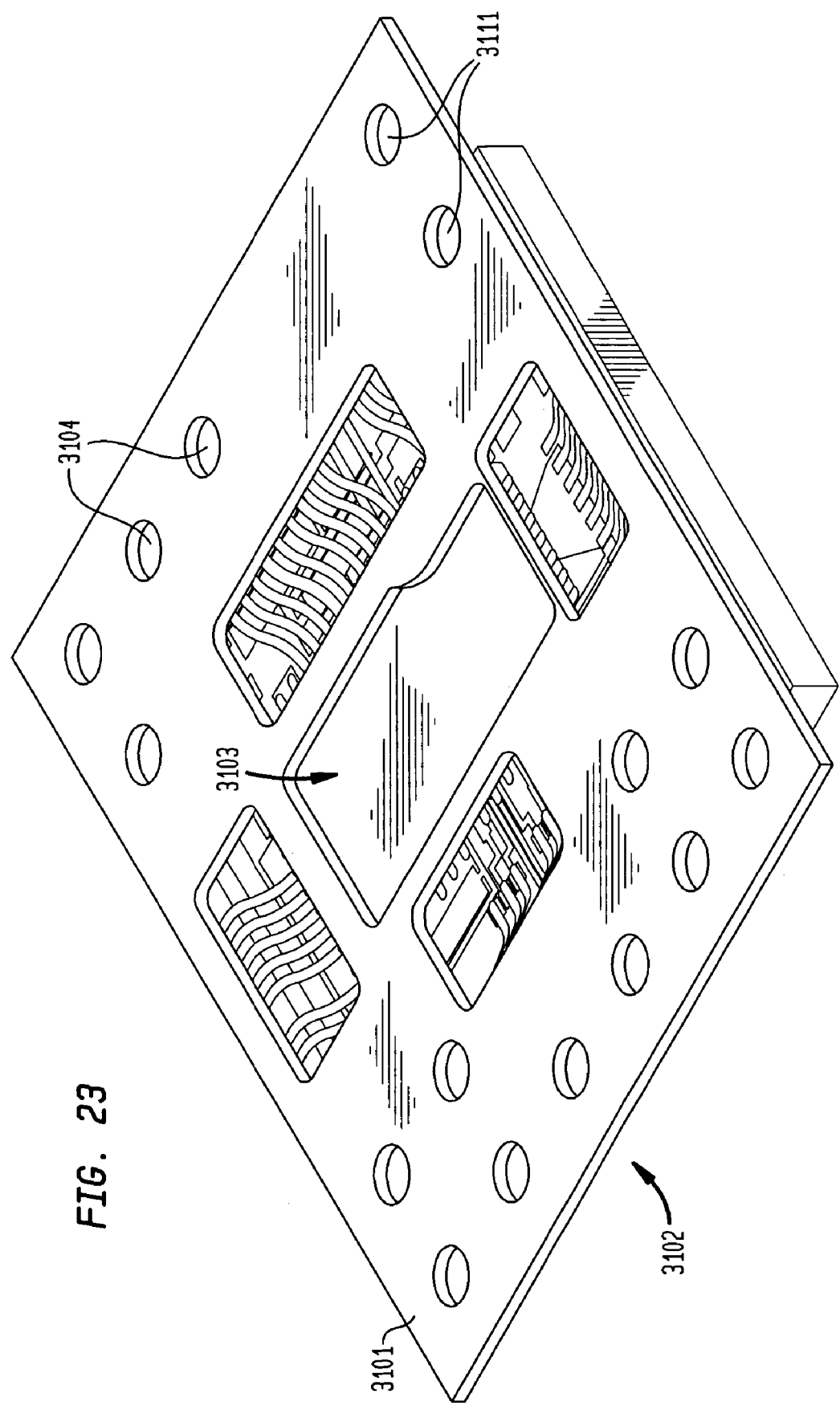

FIGS. 22 and 23 depict the component, chip carrier, or "tape" in conjunction with the dies of FIGS. 19-21. As best seen in FIG. 22, the metallic features of the chip carrier include the thermal conductor, signal terminals and signal leads, the signal leads being "active leads", all being integral parts of a single unitary metallic sheet 3100 as, for example, a copper sheet. The view of FIG. 22 shows the assembly with the dielectric layer 3101 omitted for clarity of illustration; typically, the metallic features and the dielectric layer 3101 (FIG. 23) of the chip carrier 3102 are provided as a prefabricated unit, commonly referred to as a "tape." The outwardly facing surface of the sheet 3100 (the surface facing up in FIG. 22) is a rear surface of the sheet upon which the dielectric layer is typically provided, as shown in FIG. 23. The surface of the sheet 3100 which faces inwardly towards the passive die 2900 is a front surface of the sheet. As best appreciated with reference to FIG. 22, the single metallic sheet 3100 includes an electrically continuous portion incorporating the thermal conductor 3103 and peripheral regions 3105 of the sheet at or near the edges of the package. The single metallic layer also includes signal terminals 3104 and signal leads 3106 (i.e., active leads) associated with these terminals 3104. The sheet 3100 is etched or otherwise treated so that the portions constituting the signal terminals 3104 and signal leads 3106 will be electrically isolated from the continuous portion of the sheet after the leads are connected to contacts on the passive die. That is, in the assembled state shown in FIG. 22, the signal terminals 3104 and signal leads 3106 are electrically isolated from the peripheral region and thermal conductor 3103. The thermal conductor desirably has greater area than any one of the active terminals.

Prior to assembly, the signal leads may be connected to the major portion of the sheet as, for example, where the signal leads 3106 include a breakable or frangible region 3130 such that the signal leads 3106 will be disconnected from the major portion during bonding of the signal leads 3106 to the contacts on the passive die 2900. Bond windows 3122 are provided to enable a bonding tool to deformably detach breakable leads 3106 from the metal sheet 3100 and attach them to contacts on the passive chip 2900, particularly the outer contacts of the passive chip 2900 that are exposed after mounting the active chips 3002 to the passive chip 2900. Alternatively, the signal leads 3106 can be provided in cantilevered manner from points of connection to the metallic sheet at one edge of a bond window 3122, but not connected to the metallic sheet material at the opposite edge of the bond window to the points of connection. Leads provided in such manner are referred to as "cantilevered leads." The continuous portion of the sheet 3100 entirely surrounds the signal terminals 3104 and signal leads 3106 and, thus, provides a continuous conductive plane preferably extending to or near the edges of the package. As also described above and in the '509 application, the metallic components on the tape or lead frame 3100 of the chip carrier may include one or more inductors or portions of inductors 3108. The major portion of the conductive sheet 3100, including the peripheral regions 3105 discussed above, desirably also surrounds the inductors 3108 but is electrically isolated from the inductor 3108 and inductor leads 3110. In a particular embodiment, the inductors and/or portions of inductors can be such as those described in the '333 Application, which is incorporated by reference herein.

As best seen in FIG. 23, the dielectric layer 3101 is arranged such that the signal terminals 3104 and thermal conductor 3103 are exposed for connection to a circuit board or other substrate (not shown). Also, parts of the continuous portion of the sheet 3100 are exposed by other apertures in the dielectric layer, and these parts serve as ground terminals 3111 for connecting the major portion of the sheet to the circuit board or other substrate. Ground or "inactive" leads 3112 may be attached to any portion of the continuous structure for providing ground connections to the chips. Desirably, the active leads project from the metal sheet 3100 at first ends thereof, and have breakable connections to the metal sheet 3100 at second ends. The cross-sectional view (FIG. 24) shows the same parts in the assembled state, with solder land grid bumps 3114 on the signal and ground terminals discussed above.

As described above with reference to FIGS. 15 and 17, the assembly may include an enclosure 3120 which overlies the rear surface 2908 of the passive die 2900 (the surface facing downwardly in FIG. 24), which enclosure 3120 extends to the vicinity of the chip carrier 3102. The enclosure 3120 may be bonded to the peripheral regions 3105 of the metallic sheet 3100 on the chip carrier and electrically connected thereto, thereby forming a substantially continuous conductive Faraday shield around the entire assembly.

As these and other variations and combinations of the features set forth above can be utilized, the foregoing description of the preferred embodiment should be taken by way of illustration rather than by limitation of the invention.

The invention claimed is:

1. An assembly comprising:
    a packaged semiconductor chip including:
    (a) a first semiconductor chip having a front face, a rear face, edges bounding said faces and contacts exposed at said front face, each of the faces of said first chip has a first area;
    (b) a second chip, said second chip having front and rear surfaces and contacts on said front surface, at least some of said contacts on said second chip being electrically connected to at least some of said contacts on said first chip, said front surface of said second chip facing upwardly and confronting a face of said first chip; and
    (c) a chip carrier disposed below said rear surface of said second chip, said chip carrier having a bottom surface facing downwardly away from said second chip and having a plurality of terminals exposed at said bottom surface, at least some of said terminals being electrically connected to at least one of said chips, said chip carrier having an opening coinciding with at least a portion of said rear surface of said second chip, said portion having a second area larger than said first area;
    a circuit panel mounted to said bottom surface of said chip carrier, said circuit panel having a top surface and including a thermally conductive element having a mounting surface extending in directions parallel to said top surface; and
    a flowable thermally conductive material uniformly covering at least a substantial portion of said rear surface, said flowable thermally conductive material connecting said rear surface of said second chip to said mounting surface of said thermally conductive element and spacing said rear surface of said second chip from said mounting surface, such that said rear surface of said second chip thermally communicates with said circuit panel through said flowable thermally conductive material.

2. An assembly as claimed in claim 1, wherein said thermally conductive material includes solder.

3. An assembly as claimed in claim 1, wherein said thermally conductive material includes a thermally conductive paste.

4. An assembly as claimed in claim 1, wherein said chip carrier is a sheet-like element.

5. An assembly comprising:
    a packaged semiconductor chip including:
    (a) a first semiconductor chip having a front face, a rear face, edges bounding said faces and contacts exposed at said front face;

(b) a second chip, said second chip having front and rear surfaces and contacts on said front surface, at least some of said contacts on said second chip being electrically connected to at least some of said contacts on said first chip, said front surface of said second chip facing upwardly and confronting a face of said first chip; and (c) a sheet-like chip carrier disposed below said rear surface of said second chip, said chip carrier having a thickness less than about 150 microns, a bottom surface facing downwardly away from said second chip and having a plurality of terminals exposed at said bottom surface, at least some of said terminals being electrically connected to at least one of said chips, said chip carrier having an opening coinciding with at least a portion of said rear surface of said second chip;

a circuit panel mounted to said bottom surface of said chip carrier, said circuit panel having a top surface and including a thermally conductive element having a mounting surface extending in directions parallel to said top surface; and a flowable thermally conductive material uniformly covering at least a substantial portion of said rear surface, said flowable thermally conductive material connecting said rear surface of said second chip to said mounting surface of said thermally conductive element and spacing said rear surface of said second chip from said mounting surface, such that said rear surface of said second chip thermally communicates with said circuit panel through said flowable thermally conductive material.

6. An assembly as claimed in claim 5, wherein said thermally conductive material includes solder.

7. An assembly as claimed in claim 5, wherein said thermally conductive material includes a thermally conductive paste.

8. An assembly as claimed in claim 5, wherein said second chip includes a plurality of passive electrical components.

9. An assembly as claimed in claim 5, further comprising a plurality of said second chips.

10. An assembly as claimed in 5, further comprising one or more discrete passive electrical components electrically connected to the terminals of said chip carrier.

11. An assembly as claimed in 5, further comprising a plurality of discrete passive electrical components electrically connected to at least one of said chips.

12. An assembly as claimed in claim 5, wherein said rear face of said first chip faces downwardly towards said front surface of said second chip.

13. An assembly as claimed in claim 12, further comprising leads connecting at least some of said contacts of said first chip and at least some of said contacts of said second chip.

14. An assembly as claimed in claim 12, further comprising a thermally-conductive layer between said rear face of said first chip and said front face of said second chip.

15. An assembly as claimed in claim 5, wherein said front face of said first chip faces downwardly towards said front surface of said second chip.

16. An assembly as claimed in claim 15, wherein said contacts of said first chip are bonded to said contacts of said second chip, said first chip being in thermal communication with said second chip through said bonded contacts.

17. An assembly as claimed in claim 16, further comprising a thermally conductive underfill between said first and second chips, said first chip being in thermal communication with said second chip through said underfill.

18. An assembly as claimed in claim 5, wherein said first chip is a radio frequency amplifier chip.

* * * * *